United States Patent
Malhotra et al.

(10) Patent No.: US 11,551,212 B2
(45) Date of Patent: Jan. 10, 2023

(54) METHODS AND SYSTEMS FOR MANAGEMENT OF A BLOCKCHAIN-BASED COMPUTER-ENABLED NETWORKED ECOSYSTEM

(71) Applicants: Rajeev Malhotra, Boston, MA (US); Mohd Sufyan, New Delhi (IN)

(72) Inventors: Rajeev Malhotra, Boston, MA (US); Mohd Sufyan, New Delhi (IN)

( * ) Notice: Subject to any disclaimer, the term of this patent is extended or adjusted under 35 U.S.C. 154(b) by 460 days.

(21) Appl. No.: 16/243,401

(22) Filed: Jan. 9, 2019

(65) Prior Publication Data

US 2020/0219093 A1 Jul. 9, 2020

Related U.S. Application Data

(60) Provisional application No. 62/615,868, filed on Jan. 10, 2018.

(51) Int. Cl.

| | |
|---|---|
| *G06Q 20/38* | (2012.01) |
| *H04L 67/06* | (2022.01) |
| *H04L 67/1097* | (2022.01) |
| *H04L 9/32* | (2006.01) |
| *G06Q 20/36* | (2012.01) |
| *G06Q 20/40* | (2012.01) |
| *G06Q 20/06* | (2012.01) |
| *H04L 9/00* | (2022.01) |

(52) U.S. Cl.
CPC ....... *G06Q 20/389* (2013.01); *G06Q 20/0658* (2013.01); *G06Q 20/3674* (2013.01); *G06Q 20/3678* (2013.01); *G06Q 20/3829* (2013.01); *G06Q 20/40145* (2013.01); *H04L 9/3231* (2013.01); *H04L 67/06* (2013.01); *H04L 67/1097* (2013.01); *G06Q 2220/00* (2013.01); *H04L 9/50* (2022.05); *H04L 2209/56* (2013.01)

(58) Field of Classification Search
CPC .......... G06Q 20/0658; G06Q 20/3674; G06Q 20/3678; G06Q 20/3829; G06Q 20/40145; G06Q 20/389; H04L 9/3231; H04L 67/06; H04L 67/1097
USPC ......................................................... 705/67
See application file for complete search history.

(56) References Cited

U.S. PATENT DOCUMENTS

2016/0098730 A1* 4/2016 Feeney
2018/0046766 A1* 2/2018 Deonarine et al.
(Continued)

*Primary Examiner* — James D Nigh
*Assistant Examiner* — Yin Y Choi

(57) ABSTRACT

In an example, an ecosystem is disclosed that may facilitate digital exchange of a digital asset stored as a computer executable file. The ecosystem may include a plurality of participant systems, wherein the plurality of participant systems may include at least one of an asset user system, an asset holder system, and an asset mining system. The ecosystem may include an asset wrapper associated with the digital asset and configured in the form of a multi-layered structure and computer-executable document. The ecosystem may include a codec configured as a computer executable file and associated with the asset wrapper, wherein the codec may be executed when an external request for the asset exchange is initiated. The ecosystem may include a blockchain device to execute a blockchain smart contract for the asset exchange, wherein the smart contract is executed against a pre-defined number of right tokens characterizing a specific cryptocurrency-value.

17 Claims, 12 Drawing Sheets

(56) References Cited

U.S. PATENT DOCUMENTS

| | | | |
|---|---|---|---|
| 2018/0285996 A1* | 10/2018 | Ma | |
| 2018/0337847 A1* | 11/2018 | Li et al. | |
| 2018/0036731 A1* | 12/2018 | Leong et al. | |
| 2018/0349572 A1* | 12/2018 | Chen et al. | |
| 2018/0367310 A1* | 12/2018 | Leong et al. | |
| 2019/0005595 A1* | 1/2019 | Tautenhan et al. | |
| 2019/0114395 A1* | 4/2019 | Lenchner et al. | |
| 2019/0122317 A1* | 4/2019 | Hunn et al. | |
| 2019/0129893 A1* | 5/2019 | Baird | |
| 2019/0155997 A1* | 5/2019 | Vos | |
| 2019/0392407 A1* | 12/2019 | Keskar | |

\* cited by examiner

FIG. 8

Computer-controlled networked ecosystem 100

- IP Engine 850
- ADR system 824
- Document storage device 822
- Smart contracts 820
- Blockchain device 818
- Mobile wallet 814
- Biometric recognition device 816
- Mobile application 812
- Server 810
- browser-based web application 808
- blockchain private key 806
- Private key wallet 804
- Identity verification system 802
- Private ledger 848
- Database 846
- Hardware processor 844
- Processing system 842
- Transceiver 840
- Memory circuit 838
- Blockchain computer system 836
- Distributed ledger 834
- Destination identifier 832
- Computer network 830
- Computer system 828
- Central web component 826

METHODS AND SYSTEMS FOR MANAGEMENT OF A BLOCKCHAIN-BASED COMPUTER-ENABLED NETWORKED ECOSYSTEM

CROSS-REFERENCE TO RELATED APPLICATIONS

The application claims priority to U.S. Provisional Patent Application No. 62/615,868 filed on Jan. 10, 2018, the complete disclosure of which, in its entirety, is herein incorporated by reference.

BACKGROUND

This application relates to the field of distributed computing, and more specifically to management of a block chain technology-based networking system.

Blockchain technology has been evolving to transform the internet from a network of connections to a network of value. In the prior art systems, private networks have been used for transfer of data. The times gradually evolved such that emergence and growth of decentralized services happened where the parties involved in a transaction started to rely on peer-to-peer algorithmic interactions. Further developments have led to the growth of virtual currencies.

Virtual currencies were developed with an aim to provide liquidity to payment related exchanges between multiple parties. These currencies also led to the evolution of a new generation of digital business, particularly related to payment transactions, which could function without central aggregators or trusted parties. It also opened up new vistas for workers everywhere, as they could self-organize into value-producing configurations without central coordination. The impact of these developments on creative industries could be seen as revolutionary as this could liberate rights holders—whether creative artists and/or their agencies, inventors, authors, and innovators from the inefficient, costly and friction-ridden mechanisms through which they had historically realized value.

The emergence of virtual currencies has also led to the development of blockchain technology. Blockchain is a transformative technology which is in early stages of developments. The development and implementation of blockchain technologies may depend to a large extent on the expected development of virtual currencies. Thus, it may not be incorrect to say that both the technologies, virtual currencies and blockchain, are deemed to grow hand in hand with one aiding the development of the other and vice versa. Additionally, the realization of the value of blockchain's enormous potential would require working with the underlying trends and subtle forces shaping the evolution of such foundational technologies.

On-line marketplaces for intellectual property have been in operation with varying degrees of success for over a decade. Although companies such as OCEAN TOMO®, TYNAX® and others have successfully brokered IP rights worth millions of dollars and recent entrants such as Resolute and others are providing matchmaking between tech buyers and sellers. The difficulty for these and other products has been that they have not been able to "contextualize" rights within a web of associations and contextual claims that allow buyers to learn or analyze not just the IP on offer but also quickly triangulate to key innovators, marketing resources, lawyers, bankers, and other professional who are critical to evaluating the rights. In other words, trading rights is not just a matter of nifty technology enabled matchmaking between buyers and sellers but requires a 360 degree "incentivized" ecosystem that can help generate liquidity from rights through advanced technological and inventive frameworks.

SUMMARY

In an example, an ecosystem is provided that may facilitate digital exchange of a digital asset stored as a computer executable file, wherein the ecosystem may include a plurality of participant systems, wherein the plurality of participant systems may include at least one of an asset user system, an asset holder system, and an asset mining system, wherein each of the asset user system, the asset holder system, and the asset mining system may be associated with respective participant entities registered with the ecosystem through respective digital and uniquely identifiable profiles. The ecosystem may include an asset wrapper associated with the digital asset and configured in the form of a multi-layered structure and computer-executable document, wherein the multi-layered structure includes a first layer to store source information digitally owned by a first participant, a second layer to store updates on the source information digitally owned by a second participant, and a third layer to store referencing of the updates between the first layer and the second layer. The ecosystem may include a codec configured as a computer executable file and associated with the asset wrapper, wherein the codec may be executed when an external request for the asset exchange is initiated. The ecosystem may include a codec authorizing cluster configured to initiate a handshake mechanism for performing a set of computer-controlled authorization tasks based on a private user key, wherein the authorization may determine whether the asset user system and its associated user entity may be allowed to access the digital asset digitally under existing access rights. The ecosystem may include a processing circuit configured to pull the asset associated with the asset wrapper if the codec authorization cluster authorizes the access. The ecosystem may include an encryption-decryption mechanism configured to decrypt the asset for presentation to the user. The ecosystem may include a blockchain device to execute a blockchain smart contract for the asset exchange, wherein the smart contract is executed against a pre-defined number of right tokens characterizing a specific cryptocurrency-value.

The asset wrapper may be configured with a specialized data structure containing a plurality of data fields, wherein the plurality of data fields comprising one or more of a general description field storing digital information associated with the digital asset, a contractual field storing digital information containing licensing and contractual terms for retaining the digital asset, a report infringement field digitally storing information related to procedures for reporting infringements on the associated digital asset, an additional links field for digitally storing details about the asset holder system and its respective participant entity, and a transaction history field for digitally storing information related to contact details of the asset holder system and the respective participant entity.

The ecosystem further includes a blockchain-based identity verification system, a private key wallet, and an associated private key, wherein the identity verification system includes a biometric recognition device and is configured to authorize verifiable digital identity profile attached to a blockchain private key and the private key wallet of the user participant based on biometric information associated with a user participant of the asset user system.

BRIEF DESCRIPTION OF THE FIGURES

The invention and the following detailed description of certain embodiments thereof may be understood with reference to the following figures:

FIG. 8 illustrates architectural components of an ecosystem in accordance with an embodiment.

DETAILED DESCRIPTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The terms "a" or "an," as used herein, are defined as one or more than one. The term "another," as used herein, is defined as at least a second or more. The terms "including" and/or "having", as used herein, are defined as comprising (i.e., open transition).

The methods and systems disclosed herein are based on the transformative technologies of virtual currencies and blockchain, and aim to leverage the full potential of these technologies to provide an ecosystem for social payment systems, without the need for intermediary third parties or systems.

The methods and systems provided herein disclose an online computer-enabled marketplace network (also called computer-enabled networked ecosystem interchangeably) 100, based on the transformative technologies of blockchain and virtual currencies. The computer-enabled networked ecosystem 100 is a network that may be used for discovering and capitalizing on "know-how" built upon years of research on creating value from intangible assets. The know-how can be associated with various classes of intellectual property, process knowledge, and intangible assets that include patents, copyright, trade secrets, design, music, art works, works of authorship, software code, and brand and process related assets, and the like without limitations.

Figure 1:
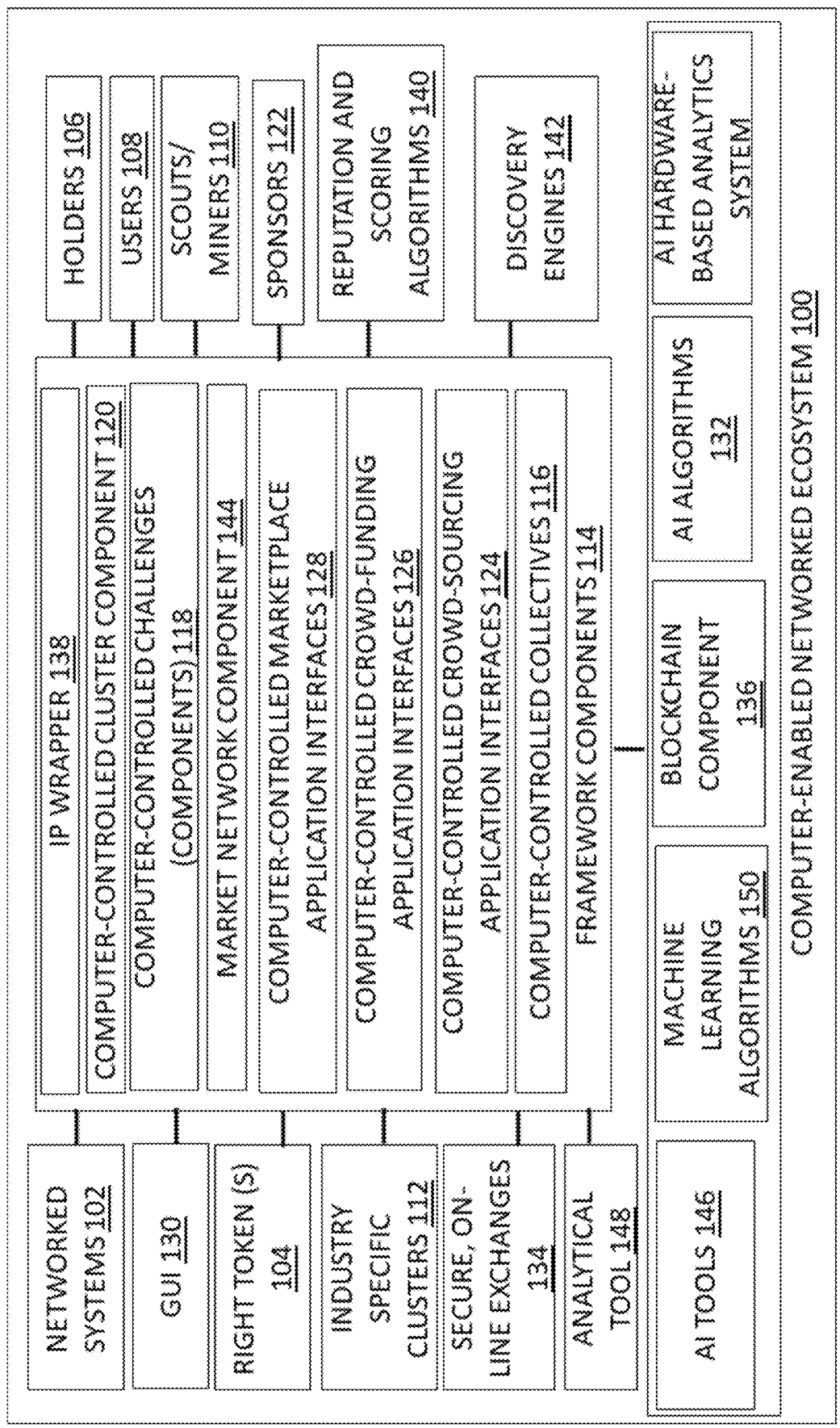
FIG. 1 illustrates a schematic diagram of an ecosystem in accordance with an embodiment.

FIG. 1 illustrates an exemplary embodiment of the computer-enabled marketplace network (also called computer-enabled networked ecosystem interchangeably) 100, in accordance with various embodiments of the present invention. The computer-enabled networked ecosystem 100 may comprise several thousand of network members also referred to as networked systems 102. For the purpose of this disclosure the term "know-how" and 'Rights' be used interchangeably without limitations and may include a plurality of classes of intellectual property, process knowledge, and intangible assets and include patents, copyright, trade secrets, design, music, art works, works of authorship, software code, and brand and process related assets.

The computer-enabled networked ecosystem 100 may allow the network members 102 or networked systems 102 to discover, exchange and monetize their know-how or rights, by allowing the networked systems 102 to transact their know-how using components of the computer-enabled networked ecosystem 100. The transactions may be facilitated by the use of a native online marketplace token, referred to herein as Right token 104. The members of the computer-enabled networked ecosystem 100 may be grouped by digitally organized industry specific clusters 112 such as water technology, medical devices, Internet of Things, and blockchain, and the like without limitations.

Further, the computer-enabled networked ecosystem 100 may be configured to provide multi-sided matchmaking between two types of network members 102: know-how holders (hereinafter referred to as "Holders") 106 and know-how users (hereinafter referred to as "Users") 108. The Holders 106 and the Users 108 are networked systems 102 controlled by respective entities to allow them to transact with each other through an enabling ecosystem of entities such as consultants, lawyers, licensing agents, and marketing and investment professionals who are often involved in the process of value creation, by using the computer-enabled networked ecosystem 100. These transactions may be performed through secure, on-line exchanges enabled by the computer-enabled networked ecosystem 100.

In some embodiments, the computer-enabled networked ecosystem 100 may be configured to enable discovery of relevant know-how, the rights holders 106, the users 108, and miners 110 and related research through their associated systems.

In some embodiments, the computer-enabled networked ecosystem 100 may be configured to enable publishing of unregistered rights including trade secrets, design, graphics, and other intellectual property through computer-connected display systems.

In some embodiments, the computer-enabled networked ecosystem 100 may be configured to enable collaboration among the network members 102. The collaboration may be enabled through the use of various platform components called framework components 114 such as computer-controlled collectives 116, computer-controlled challenges 118, and off-line events that may be operated through hardware-managed and software controlled components, discussed later.

In some embodiments, the computer-enabled networked ecosystem 100 may be configured to enable diligence of know-how, by performing validation and valuation of intangible assets through a plurality of validation systems and tools.

In some embodiments, the computer-enabled networked ecosystem 100 may be configured to enable various transactions, including but not limited to licensing, sale, syndication and pooling of computer-executable rights through a token-based system that simplifies currency exchange issues and smart contracts that encode for changing licensing and payment provisions.

In some embodiments, the computer-enabled networked ecosystem 100 may be configured to provide security for intellectual property assets of the network members 102 and associated systems. Intellectual property and related rights such as trade secrets and other "unregistered" rights are vulnerable to being stolen from databases and other unsecured storage mechanisms. The recovery of damages for these stolen rights can itself be costly and painful to realize as it becomes difficult to establish "priority" when a trade secret, idea, design, innovation disclosure, or other intellectual property has not been time-stamped and adequately and privately recorded.

The computer-enabled networked ecosystem 100 disclosed in the various embodiments of this invention may address various challenges by providing a safe, secure and time-stamp based ecosystem for storage and retrieval of member's intellectual property and related rights related data. The computer-enabled networked ecosystem 100 may provide a beneficial solution to the problem of legally and responsibly leveraging intellectual property (IP) from the rights holders 106, faced by "open innovation" promoters and benefactors.

The computer-enabled networked ecosystem 100 may provide systems (such as associated with promoters and benefactors) a secure and trustworthy platform for seeking innovation providers' computers in a network deploying the ecosystem 100.

In some embodiments, the computer-enabled networked ecosystem 100 may be configured to include a plurality of innovation pipelines from industries that are dependent on the rights. These pipelines may be enabled by a computer-controlled cluster component 120 of the computer-enabled networked ecosystem 100.

The computer-controlled cluster component 120 may be a section of the computer-enabled networked ecosystem 100 which may include further listings grouped together according to industries in the form of computer-executable files. These industries may include such as pharmaceuticals, energy, IoT, automotive, bio-tech, and digital music and entertainment.

In some embodiments, the active participants or members or systems 102 of the computer-enabled networked ecosystem 100 may be classified according to their digital profiles. These classifications may include such as the holders 106, the users 108, the miners 110, and sponsors 122 and their associated systems within the ecosystem 100.

The holders 106 may be a group of members comprising inventors, creative professionals, and experts who have the know-how and the rights that they wish to leverage toward collaboration, out-licensing, sale, collateralized loans, and development through the computer-enabled networked ecosystem 100. The holders 106 may also include associated systems and computing devices with the inventors, creative professionals, and the experts who have the know-how and the rights that they wish to leverage toward collaboration, out-licensing, sale, collateralized loans, and development through the computer-enabled networked ecosystem 100.

The users 108 may be a group of members and associated system and computing devices comprising corporations, institutional sponsors (such as universities, quasi-governmental organizations, and philanthropies), investors (such as venture capitalists, funds, angels and the like), and research centers (such as research labs, think-tanks and the like) who may wish to use the know-how and the rights through collaboration, in-licensing, acquisition, syndicated transactions, and development through the computer-enabled networked ecosystem 100.

In embodiments, published rights (those rights that are visible publicly on the computer-enabled networked system 100) may be validated by a network of the miners 110. The miners 110 can also offer to contribute to dispute resolution about the uniqueness and originality of the published rights.

The miners 110 may be a group of members and associated systems or computing devices comprising service providers (such as brokers, licensing executives, marketing consultants, lawyers and advisors who wish to help realize transactions) and the users who wish to facilitate transactions and know-how or rights transfers between the holders 106 and the users 108 or on their own account (in which case a Miner is also a User). The miners 110 may also be instrumental in scouting for insight and foresight in fast-moving industry clusters and helping with protecting IP rights through validation, patent or trademark filings, and valuation opinions.

The sponsors 122 may be a group of members or associated systems or computing devices comprising organizations providing content (such as for advertising, targeted messaging within or across particular clusters) and sponsorship (such as through challenges, bounties, and awards) that lead to payments to the holders 106. In some embodiments, the sponsors 122 may be users too. For example, in the case of a private company crowd-sourcing innovation from multiple holders, and they could also be mission-driven, philanthropic organizations.

The different classified members or networked systems 102 of the computer-enabled networked ecosystem 100 may be able to collaborate with each other through the various framework features 114 bundled into the computer-enabled networked ecosystem 100. The collaborations may be accessible to the members 102 on the payment of a prescribed fee, which may be paid in denominations of the native token 104 of the computer-enabled networked ecosystem 100, herein referred to as the right token 104.

The various framework components 114 bundled into the computer-enabled networked ecosystem 100, which may be accessible on payment of a fee in tokens to the participants or the members or the networked systems 102 of the computer-enabled networked ecosystem 100 may include such as the computer-controlled collectives 116, computer-controlled crowd-sourcing application interfaces 124, computer-controlled crowd-funding application interfaces 126, and computer-controlled marketplace application interfaces 128. In some embodiments, each of these components may be provided in a computerized menu bar displayed on a webpage or an application interface of the computer-enabled networked ecosystem 100 and accessible by the participants or members or networked systems 102 through a user-interactive graphical interface (GUI) 130. By selecting a computerized menu option from a computerized menu bar as desired, the members 102 may be able to access the services digitally provided in the selected component out of the framework components 114.

The collective component (also referred interchangeably as computer-controlled collectives) 116 may include special interest groups where members 102 may be able to access features that may enable them to perform a set of specialized activities digitally on the computer-enabled networked ecosystem 100. This set of specialized activities may include such as exchange of digital documents, audio, and video files; engaging in group-chat and messaging digitally; organizing the collectives' members into syndicates to access funding or respond to pre-defined challenges digitally over a blockchain network or a typical computational network.

The crowd-sourcing component (also referred interchangeably as computer-controlled crowdsourcing application interfaces) 124 may include providing information pertaining to hosted programs sponsored by institutions or corporate members who are seeking to leverage the know-how embedded in the computer-enabled networked ecosystem 100 for spurring innovation. For example, the computer-enabled networked ecosystem 100 may provide information related to computer-executable or -controlled open challenges 118 that can be hosted by the entities or members within the system 100 digitally. The computer-enabled networked ecosystem members 102 may access this information and may choose to respond to some posted information on the computer-enabled networked ecosystem 100 as part of the computer-executable challenge information. In some examples, computer executable responses may be made on the basis of the geography information related to the computer-executable open challenges (also referred to simply as challenges for the purpose of simplicity without limitations) 118 provided on the computer-enabled networked ecosystem 100. For example, for challenges related to energy efficient water desalination and leakage control, responses may be sent electronically to request members which are more relevant in the context of this particular challenge domain to provide digital responses.

In this way, the computer-enabled networked ecosystem 100 may enable the members 102 to get engaged in globally relevant and critical innovation streams. For example, the computer-enabled networked ecosystem 100 may facilitate crowd-sourcing initiative through the computer-controlled crowdsourcing application interfaces 124, which may for example include seeking medical device innovations for certain intractable problems that have led to over 30,000 lawsuits related to complications experienced during surgical procedures, from the members 102 worldwide. These and other features of the computer-enabled networked ecosystem 100 may enable sustainable innovation development across the globe. Similarly, other processing rules may be integrated for various operations executable within the system 100.

The crowd-funding component (also referred interchangeably as computer-controlled crowd funding application interfaces) 126 may include enabling the holders 106 to seek "pledges" (for funding) from other members 102 for their creative work through digital methods. For example, a crowd-funding project may include enabling classical musicians to fund new artistic work through pledges of tokens such as using the right token 104. In return, the artists may provide funders with early recordings, T-shirts, and memorabilia etc. without limitations. All this exchange may be enabled by posting such information on the computer-enabled networked ecosystem 100 that may be readable by machines and hardware.

The market place component (also referred interchangeably as computer-controlled marketplace application interfaces) 128 may include providing the computer-enabled networked ecosystem members 102 a marketplace digitally where the holders 106 and the users 108 may be able to offer and seek the know-how and the rights maintained in a computer executable digital form. The marketplace component 128 may also enable syndication, pooling, and collateralization of the rights stored digitally. The marketplace component 128 may be enabled by using artificial intelligence (AI) algorithms 132 that could autonomously help the members 102 connect with offers and requests (based on their stated preferences). The AI algorithms 132 may further enable a patent or right transaction to benefit from attracting a complementary bundle of the know-how or right or an expert being plugged into a fast-developing deal given their past experience and reputation with, say, licensing of certain types of the assets or rights without limitations.

The plurality of features and components 114 of the computer-enabled networked ecosystem 100 may be configured to enable secure online exchanges 134 of the know-how or the rights digitally in a secure yet open manner and enabling the members 102 to obtain a value in return of their efforts in developing the know-how or rights and give them their due rights.

The computer-enabled networked ecosystem 100 may be configured to provide new options for realizing value from "unregistered" rights. For example, considering the scenario where many innovators are unable or unwilling to disclose their innovations by filing patents, design, or copyright protection due to time and expense required for these. In such a scenario, the computer-enabled networked ecosystem 100 may provide the holders 106 a complementary mechanisms, thus promoting creativity and innovation. Further, a vast majority of innovation is often not protected through patents but through trade secrets, thus, the computer-enabled networked ecosystem 100 may be configured to allow the know-how (which covers the gamut from trade secrets to various forms of unregistered IP rights) to be registered and protected. Trade secrets also form the largest percentage of IP rights to become tradeable in a liquid marketplace. And so, by registering such know-how through the computer-enabled networked ecosystem 100, the problem of trade secret theft, which is a trillion-dollar problem, can be mitigated.

Even though there isn't a priority bar on trade secrets (which by definition are kept secret), it is possible with the disclosed inventive system 100 to unlock enormous reservoirs of value that has been kept secret as such mechanisms for generating such value could, through a safe and time-stamped series of disclosures stored as computer executable files, be shared with others who agree to keep it confidential pending a transaction related to that trade secret. This makes it feasible to exchange and monetize trade secrets that have hitherto been untradeable assets.

In some embodiments, the computer-enabled networked ecosystem 100 may also enable the rights holders 106 to register their rights through immutable and secure mechanisms that are encrypted yet searchable, and enables smart contracts, discussed later, that allow the holders 106 to decide which other network members 102 to provide data access permissions to and at what price. Thus, the computer-enabled networked ecosystem 100 can provide an approach for know-how management that may allow the vast, latent, reservoir of rights that have hitherto remained undisclosed, secret, or unregistered to become accessible for spurring innovation.

In some embodiments, the computer-enabled networked ecosystem 100 may also allow the network members 102 to register their know-how (or rights referred interchangeably herein throughout the document without limitations), discover potential partners for commercialization and innovation, and generate value through licensing and optioning of their rights. The computer-enabled networked ecosystem 100 may also provide the network members 102 a foundation for aggressively scaling their own network and provide a low risk pathway for transforming how the know-how is discovered and monetized, all this using the right token 104.

The right token 104 may be configured to provide a decentralized rights management token that may facilitate the evolution of an algorithmic market-network for registering, discovering, evaluating, and transacting the digitally maintained and computer executable know-how or other forms of the rights. Such decentralized Apps (called "DApps" herein interchangeably without limitations) may run a blockchain with the powered native protocol token (right token 104), which may enable the miners 110 that may also be the users 108 of such DApps to earn the right tokens 104 by facilitating rights management for other DApp users. In tandem, the rights holders 106 may spend the right tokens 104 for registering their rights and for hiring the miners 110 to manage or transact their rights digitally through the computer-enabled networked ecosystem 100. By enabling the rights to be exchanged and monetized through the right tokens 104, liquid market for the rights may be facilitated digitally.

In embodiments, the miners 110 may also be instrumental in verifying and validating uniqueness of the rights uploaded on to the system 100 and may receive micro-payments for these services in the form of the right tokens 104.

The market-network system (that is the computer-enabled networked ecosystem) 100 may be configured to run on a blockchain also referred to as a blockchain component 136 with the native protocol token—the right token. The network members 102 may be able to earn the native protocol tokens 104 by facilitating the rights management for other network members 102 connected to the system 100. These members which may facilitate the rights management for other network members are known as the miners 110, as discussed above, on the computer-enabled networked ecosystem 100. The other network members (that are not miners), may spend the right tokens 104 for registering their rights and for hiring the miners 110 to manage or transact their rights. By enabling the rights to be exchanged through the right tokens 104, the computer-enabled networked ecosystem 100 may enable a liquid market for the rights in a digital computer-enabled manner.

In some embodiments, the right token 104 may be used to denominate the revenues earned by the computer-enabled networked ecosystem 100.

In some embodiments, the right token 104 may be used by the Holders 106 to pay low, nominal fees in denominations of right token 104 to publish any previously unregistered rights. In some embodiments, the computer-enabled networked ecosystem 100 may allow such fees to be waived or subsidized by a type of the network members 102 such as sponsors 122. For example, the computer-enabled networked ecosystem 100 may include digitally controlled computer executable files defining open challenge components 118 wherein various network members 102 may be requested to provide research inputs for developing an innovation ecosystem for niche and promising technology areas. Such digitally handled open challenges may be open to a large plethora of the network members and systems 102 and thus no fee may be charged to further the cause of uplifting research efforts in those technology areas.

Similarly, there may be certain humanitarian or philanthropic causes which may be promoted using the computer-enabled networked ecosystem 100 without charging any fees. In some examples, the Holders 106 may list their know-how, such as IP or patents, that they may already have filed or been granted and which they may be seeking to monetize digitally, without paying any fees.

In some embodiments, the computer-enabled networked ecosystem 100 may be configured to curate know-how related documents from multiple sectors. These know-how documents may be assembled through publicly available data sources. Some know-how related documents may be registered by the computer-enabled networked ecosystem members 102, the holders 106. These holders 106 may become computer-enabled networked ecosystem members 102 by joining for free and listing their interests and areas of expertise. In return, the holders 106 may earn micro-payments from other network members who just want to view their know-how registered through the platform or ecosystem 100. The micro-payments may be made by using the right tokens 104.

The computer-enabled networked ecosystem 100 digitally organizes the open challenge components 118 in conjunction with institutional sponsors, crowd funding for the Holders 106, facilitates industry conferences in vertical sectors, and provides infrastructure for collaboration and communication between the holders 106 and the users 108. All these mechanisms are intended to foster a sense of community between the holders 106 and the users 108 and respective networking among the associated hardware systems over the computer-enabled network ecosystem 100.

In some embodiments, the computer-enabled networked ecosystem 100 may enable the members 102 to facilitate transactions and collaboration between the rights holders 106 and the users 108. The miners 110 may provide digital services such as involving development, valuation, pooling, syndication, and monetization of the rights through the use and exchange of a set of computer executable files representing and/or storing the rights digitally. Just like other viewers of information on the platform 100, the miners may pay fees (and execute smart contracts) for viewing confidential details about the published rights which may be denominated in the right tokens 104. In some examples, the holders 106 may pay to the miners 110 some fees for services that they may choose to receive.

In some examples, some of the users 108 may be able to join and become the members 102 of the computer-enabled networked ecosystem 100 for free and pay fees for viewing the published rights and availing of the digital services provided by the miners 110.

In some examples, the networked members 102 may pay small fees for "upgrading" their membership to access specialized tools and benefits—such as research tools, hosting collaboration through dedicated virtual spaces, such as the collective components 116, and the crowd-sourcing components 124 or crowd-funding components 126 of the know-how as discussed above.

In some examples, some data and information provided on the computer-enabled networked ecosystem 100 may be accessible for free. For example, there may be no fees charged for viewing request for proposals (RFPs) posted on the computer-controlled marketplace application interfaces 128 that may digitally list the know-how available for licensing or sale by the various entities or participants or the members 102.

In some embodiments, the computer-enabled networked ecosystem 100 may enable the sponsors (typically, institutional groups or their associated systems and computing devices) 122 to request that the computer-controlled marketplace application interfaces 128 or other miners 110 host crowd-sourcing or crowd-funding activities, for fees which may also be denominated in the right tokens 104. Such requests may be made such as by posting request related content on the computer-enabled networked ecosystem 100, or by contacting specific members 102 such as by messaging or email, using their profile information provided on the computer-enabled networked ecosystem 100.

In some embodiments, the computer-enabled networked ecosystem 100 may enable earning facilitation fees for transactions—such as viewing fees, licensing payments, sale proceeds, rewards provided, or other mining fees earned—as a percentage of these payments. All facilitation fees may be paid by the party receiving payment and may also be denominated in the right token 104. Fees earned by the miners 110 or the rights holders 106 may also be subjected to a transaction charge to the computer-enabled networked ecosystem 100. All the fees may be in denominations of the right tokens 104.

The right token 104, at its essence, may be defined as the liquidity "fuel" that may power the system 100 and components thereof such as its network marketplace for a digital and technology-enabled exchange across the computer-enabled network ecosystem 100. It may be required to build, scale, and enable the system's know-how. From a perspective of the members 102 of the system 100, each transaction that may result in viewing, sponsorship, collaboration, or transfer related to the know-how may result in an exchange of the right tokens 104 (minus all transaction charges that may be required to operate the system). In return, the members 102 may receive information, insight, collaboration, and the know-how, all of which may be tailored to specific requirements. In effect the right token 104 may set up the incentive mechanisms for deepening and broadening the framework components 114 of the system 100, in effect, providing liquidity to an asset class that may heretofore been largely illiquid.

The right tokens 104 may be minted, leveraging blockchain's asset issuance technology (referred to herein as Applied Token). The Applied Token may involve a platform that may be used for creating and trading bespoke digital assets and crypto-currencies. It may include a software layer built on top of Ethereum blockchain (IRC 20ERC20 token definition) that may enable next-generation Ethereum features. The usage of the Applied Token platform may further enable the right tokens 104 and Ether wallet compatibility for ease of use and exchange. The right tokens 104 may be held in the Applied Token treasury awaiting distribution upon the completion of a validated member transaction related to any of the elements within the system capabilities and application domains.

An important point of note is that although the system 100 may utilize the Applied Token for asset issuance, this can may integrate further technologies in the future. For example, it can integrate with or exchange tokens with other IP industry digital currency and leverage the capabilities of an IP wrapper 138 of the system 100, know-how "minting, treasury and transaction fulfillment, syndication and distribution. The IP wrapper 138 is discussed hereafter.

Transactions may be created by the holders 106, users 108, and the miners 100 that may be engaging in rights management. A protocol facilitating the right tokens 104 may enable know-how publishing, promotion, and transaction via a network of independent miners that may not rely on a single coordinator, where:

The holders 106 may make the right tokens micro-payments to publish their rights (on the system 100 and, possibly, other platforms), and for specialized research tools and services, and for commissions and charges paid for managing their rights.

The holders 106 may receive the right tokens micro-payments for views of their "minted" know-how and receive payments designated (by the holder 106) in the right tokens 104 or in fiat currency for transfers of any of their rights (which may include patents, applications, designs, and trade-secrets or any other forms of IP or rights)

The miners 110 may earn the right tokens 104 for providing various rights management services that may include validation, diligence, valuation, licensing, pooling and syndication services. The miners 110 [and any other viewers] of the know-how may make the right tokens micro-payments for viewing rights on the system 100 (and possibly, other platforms that may overtime support the right tokens 104).

The members 102 may make the right tokens micro-payments for viewing the rights, and for specialized research tools and services, and for charges, transaction commissions etc. Payments made to license or acquire the rights may be designated in the right tokens 104 or in fiat currency based on the IP wrapper 138 of the know-how which triggers an appropriate "smart contract".

The members 102 may make the right tokens micro-payments for access to system's supporting capabilities and tools (such as various framework components 114).

Sponsors 122 may pay the right tokens 104 or fiat currency for sponsoring crowd sourced challenges, awards, bounties, and promoting sponsored content (ads, targeted messaging, and accessing traffic analytics). These sponsors 122 may need not become the members 102 for various reasons (such as choosing to appear outside the fray of the commerce conducted through the platform 100); in which case the system 100 may facilitate their activities and payment preferences.

"Good citizen" activities may earn micro-payments from the system 100. These may range from providing reputational scores following a transaction to each of the participants in the transaction to following-through on connection requests from other members 102 to posting contributions to the platform's social network.

The system 100 may also reserve a certain percentage of the tokens issued to "community building" and "dispute resolution"—from rewarding good citizen behavior to promoting off-line meet-ups in a particular cluster or related to a challenge etc. to adjudicating on disputes. These will be determined on both a platform wide basis and on a cluster specific basis as the platform evolves and builds critical mass in that cluster.

Similarly, the system 100 may form a foundation that may reserve an "evergreen" pool of the tokens 104 that may be replenished from revenues to fund R&D, cross-pollination, and collaboration on projects that are cause-related to philanthropic and inter-cultural advances. For example, one may expect to endow the challenges for treating neglected tropical diseases or progressing science for enhancing farming of neglected crops and edibles in developing countries. The challenges may be funded for "moon-shots" in niche markets and cultural settings (such as for public art that may stimulate tourism and exchange between certain geographies).

Although other forms of tokens may enable some of the activities described above, the demand for the right tokens 104 uniquely may be tied to features such as the IP Wrapper 138, reputation and scoring algorithms 140, and AI-based discovery engines 142. As far as possible, the system 100 may insulate the members 102 of the ecosystem 100 to fluctuations in other crypto-currencies whose value may rise and fall due to market forces outside control. Instead, the right token 104 as an industry standard IP token that may also have uses in other marketplaces and rights management ecosystems may be promoted since it may be underpinned by millions of registrations from the right token holders 106.

In some embodiments, the computer-enabled networked ecosystem 100 may be configured to create an incentivized ecosystem for promoting a matchmaking process between the two types of network members 102, the holders 106 and the users 108. The matchmaking process may be enabled digitally by accessing a plurality of associated network features, such as transaction support, managing reputations, calculating member earnings in terms of the tokens 104 and the like. The network members 102 may be configured to earn reputations which may be based on their accrued behavior over multiple transactions.

In some embodiments, these digital reputations may be built by taking into account two factors: the tokens earned, and the ratings provided by the parties to each transaction based on their satisfaction with the counter-parties' behavior. The reputations may also depreciate over time in order to encourage the members 102 to transact more regularly on the platform 100. In some embodiments, the computer-enabled networked ecosystem 100 may integrate applications that include embeddable "badges" that announce their spaces within the online marketplace component 128 and the reputations and could be associated with social media for promoting and expanding on the rights.

In some embodiments, a badge may be a graphic icon or a widget that may be embeddable on various other webpages or display interfaces such as the graphical user interface 130. For example, some members may be able to get a "badge" that may be embedded on their FACEBOOK®, LINKEDIN® and other social media page, in order to announce that they are a "five star" member of the computer-enabled networked ecosystem 100 and provide a link to that member's "Rights Interface" on the computer-enabled networked ecosystem 100. The rights interface may be a webpage that may list the user's various rights and related interest and connections on the marketplace network component 128 of the computer-enabled networked ecosystem 100. In some embodiments, the network members 102 who put their badges on their social sites may be rewarded. Similarly, rewards may also be provided to the computer-enabled networked ecosystem members 102 who may invite other friends to join the computer-enabled networked ecosystem 100. Other badges could also provide a seamless link to smart contracting infrastructure for licensing and fractional ownership of the related rights. Providing such a rights-based, networking platform for creative professionals across industries generates tremendous options for cross-pollination of innovative ideas, dissemination of knowledge, and the monetization of creative output.

In some embodiments, the computer-enabled networked ecosystem 100 may provide a market network component 144. The market network component 144 may be configured to enable the rights holders 106 to interact with the rights users 108 through the computer controlled market application interface 128. In some embodiments, some of these interactions may be facilitated by the miners 110 who may be able to bring together transactions and knowledge exchanges digitally. However, there may also be embodiments, where some of the rights holders 106 may directly interact with the rights users 108 digitally.

In some embodiments, the computer-enabled networked ecosystem 100 may be configured to provide a specialized framework and data structure (shown in FIG. 2) for storage, use and dissemination of the know-how and right related data. Each right registered through the computer-enabled networked ecosystem 100 digitally may have an associated specialized data structure, such as the IP Wrapper 138.

Figure 2:
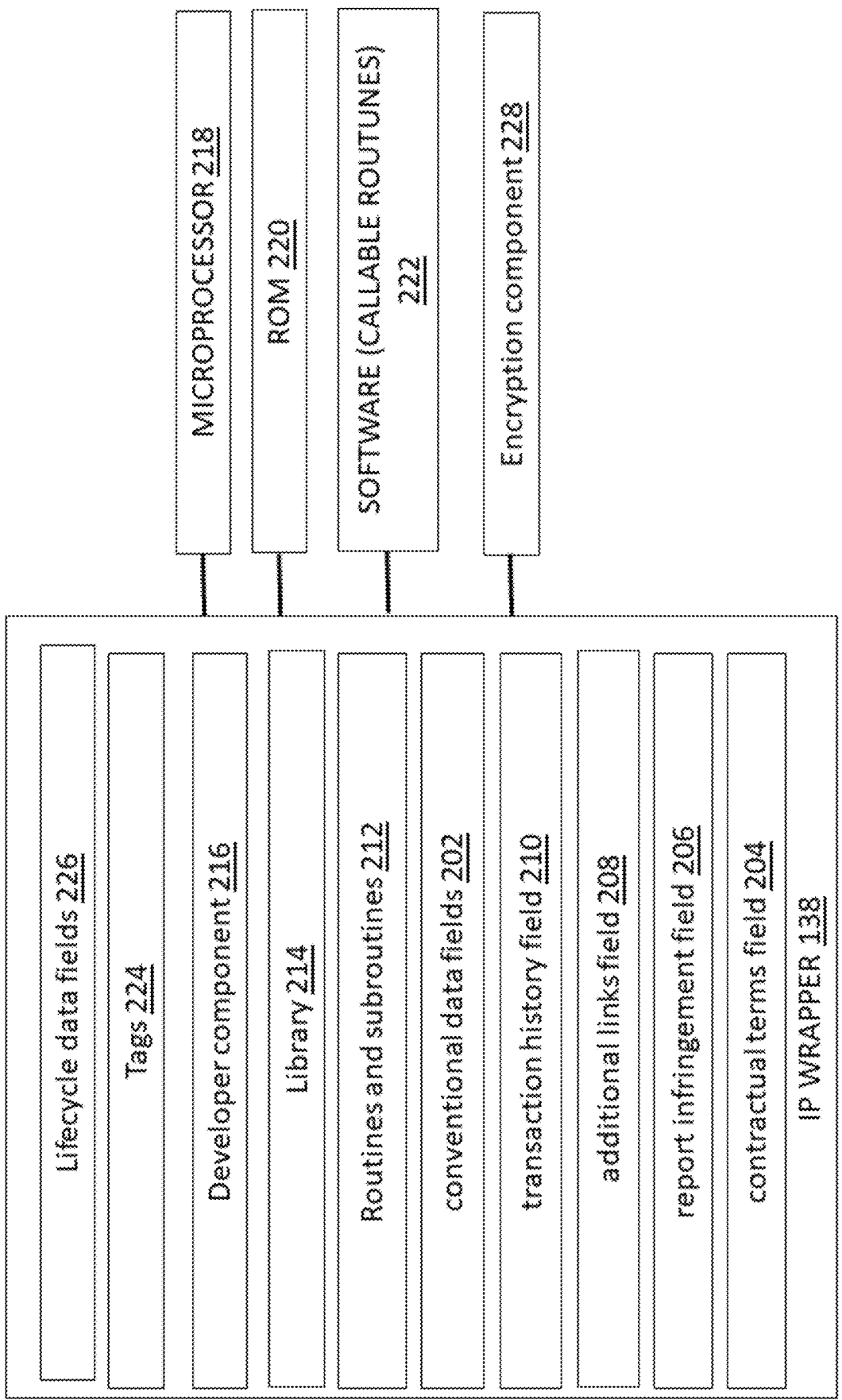
FIG. 2 illustrates a schematic diagram of an asset wrapper in accordance with an embodiment.

The IP wrapper 138 is illustrated in FIG. 2 in accordance with an embodiment of the invention. Generally, any rights related data on other platforms include descriptions of patents, trademarks, and designs that are found in traditional rights registries maintained by patent and trademark offices. But the specialized data structure (IP Wrapper) 138 offered by the computer-enabled networked ecosystem 100 may be configured to include these conventional fields 202 and many more fields or layers of data. These fields of data may include but are not limited to a contractual terms field 204, a report infringement field 206, an additional links field 208, and a transaction history field 210.

In some embodiments, the contractual terms field 204 may include information related to licensing and contractual terms for retaining a right or know-how.

In some embodiments, the report infringement field 206 may include information related to procedures for reporting infringements on the associated right or the know-how.

In some embodiments, the additional links field 208 may include information related to additional details in blockchain or cloud about the rights holder 106 and their know-how, such as information about prosecuting attorneys involved with patenting, market research, videos of prototypes that embody relevant right, references about value it can provide and the like.

In some embodiments, the transaction history field 210 may include information related to contact details of the rights holder and, possibly, payee details for the right holder for transacting the right in fiat currency.

The native protocol (dotRTC or protocol simply) driving the native protocol token 104 may provide several advantages when integrated with the computer-enabled networked ecosystem 100 in that each right registered (a process referred to as "minting") through the platform protocol may have its own IP Wrapper 138. Unlike descriptions of patents, trademarks, and designs that are found in traditional rights registries maintained by patent and trademark offices, the IP Wrapper 138 of the computer-enabled networked ecosystem 100 may contain a full complement of the following elements without limitations:

Validation and verification of the novelty and non-obviousness of each right may be facilitated digitally by a combination of expert and algorithmic review and expressed as a score. Assessing non-obviousness and novelty of trade secrets digitally may require disclosures but, the disclosed system 100 may enable trade secrets to be shared with appropriate safeguards and certain holders may choose to allow the miners 110 to inspect their trade secrets and provide certifications of their validity and even value digitally.

Licensing terms and/or contractual terms for retaining know how use of the rights under various circumstances may include options, exclusive and non-exclusive use limitations, field-of-use and geographic constraints, time-bound usage limitations, regimes for standard essential patents ("SEP"s).

How to report activities that may infringe on or represent misappropriations of these rights may be facilitated with the current ecosystem 100. For example, if a trade secret has been stolen then a miner 110 may serve as a "whistle blower" and help uncover such illicit usage through digital conversations and auto-alerts.

Links to additional details in blockchain/cloud about the rights holder and their know-how (including prosecuting attorneys involved with patenting, market research, videos of prototypes that embody relevant right, related to their rights, and references about value it can provide can be provided.

Transaction history which articulates who and when used the know-how right in the past may be provided through the protocol.

Instructional videos that describe applications of the right may be provided and may also outline how the associated know-how could be enhanced in the digital framework of the current ecosystem 100.

Contact details of the rights holder 106 and, possibly, payee details (if the right is available to be transacted only in fiat currency can be presented via graphical user interfaces.

The protocol comprises of two primary elements:
The IP Wrapper 138
Certain assets; such as previously unregistered Rights, which will be encoded in "parallel" blockchains which run in tandem to facilitate safeguarding, production, and transactions related to the IPR (intellectual property rights referred to as rights or know how interchangeably).

The protocol may spawn multiple marketplaces, especially in areas where the underlying value chains support modular forms of governance. Modular value chains may be characterized by high complexity transactions that can also be highly codified and traded among expert entities.

In some embodiments, the various fields of the data related to the IP Wrapper 138 may be encapsulated by using any of the currently known data structure, including but not limited to binary trees and linked lists, while at the same time incorporating additional features in order to emulate new data structures. The data structure may be accessible for various database operations, which may include some standard database operations such as data comparison, data merging, data sorting, data indexing, data manipulation, and the like. In addition, the data structure may be configured to support additional operations which may be specifically related to the computer-enabled networked ecosystem. These operations may include for example, data privacy management, data validity, data authentication, data rights management, data expiry, data transaction status and the like.

In some embodiments, the various data operations for the IP Wrapper 138 data structure may be configured to enable creation, management, transfer, manipulation, access, display and security of the data structure. This may be enabled by providing special methods, routines, and subroutines 212 for each of these operations. The special methods, routines and subroutines 212 may enable the data structures to be readily accessible for transactions using the computer-enabled networked ecosystem 100. In some examples, the IP Wrapper 138 data structure may be converted to a portable data structure, such as a data structure known in the art, to cause transfer and transactions for the data structure. The computer-enabled networked ecosystem 100 may be used to enable such transfer and transaction of the IP Wrapper 138 data structure using the specialized routines and sub-routines 212. The computer-enabled networked ecosystem 100 may also be configured to enable displaying of the IP Wrapper 138 data structure during, before and after the transactions, in a user-friendly format. For example, the IP Wrapper 138 data structure may be associated with various graphic icons which may reflect the state of the IP Wrapper 138, such as transacted, sold, recently uploaded, updated and the like. The computer-enabled networked ecosystem 100 may enable provision of flexible routines for frequent, modular and easy update of the status of the IP Wrapper 138 data structures' display related data.

In some embodiments, the routines and subroutines 212 related to access, manipulation and display of the IP Wrapper 138 data structure may be provided in a library 214 associated with the computer-enabled networked ecosystem 100. In some examples, these routines and subroutines 212 included in the library 214 may enable a developer component 216 associated with the computer-enabled networked ecosystem 100 to define functionality related to the creation and manipulation of known data structures digitally. In some examples, these routines and subroutines may include standard routines know in the art for access and manipulation of data structures, such as a binary tree file structure routine, a hierarchical file structure routine, and additional routines may be provided for operations and manipulations specifically related to the computer-enabled networked ecosystem 100. For example, a privacy management subroutine, an icon update subroutine, a transaction history management subroutine and the like. The library of routines and subroutines 214 may also provide functionality related to display of the IP Wrapper 138 data structure in a user-friendly format. In addition to the described routines and subroutines 212, the library 214 may also include description about the data types, operators, interfaces, functions, and the like, useful in implementing various functionality related features of the computer-enabled networked ecosystem 100.

In some embodiments, the library 214 may be implemented as part of a microprocessor 218 or in ROM 220, or in software 222, as a library of callable routines.

In some embodiments, the IP Wrapper 138 data structures may be stored in the form of tables, such as in a relational database. The tables may be configured to provide functionality related to storage, access, indexing, security configurations management and manipulation related operations of the IP Wrapper 138 data structures.

In some embodiments, the IP Wrapper 138 data structure may include tags 224 for associating the IP Wrapper 138 data structure with the tags 224 that may enable associating the IP Wrapper 138 data structure with data from other databases.

In some embodiments, the IP Wrapper 138 data structure may include lifecycle data fields 226 for reporting various stages in the lifecycle of the IP Wrapper data. These stages may be related to such as registering, transacting, modification, expiry and access related phases of an IP Wrapper enabled data and the know-how or right. The IP Wrapper enabled know-how or right includes various fields. One of those fields may include information about lifecycle stage of the know-how or the right. Apart from lifecycle phase field, the IP Wrapper enabled data also includes various other fields such as discussed previously, including, the contractual terms field, the report infringement field, an associated people field and the like.

In some embodiments, the contractual terms field may include information related to licensing and contractual terms for retaining a right or know-how. The information included in the contractual terms field may include confidential information. To ensure security and privacy of data, the information may be stored in an encrypted format facilitated through an encryption component 228. Further, access to the information may be password protected, wherein the password may include a hash of some user credentials and information data, which may be provided to the user at the time of registering of the know-how. The user-credentials may be related to such as user name, user type, user's date of birth or some other user data. The IP Wrapper 138 may also associate user information with other fields related to the know-how, such as the report infringement field.

In some embodiments, the report infringement field 206 may include information related to procedures for reporting infringements on the associated right or know-how. The user information may include such as user details related to the infringements, such as associated legal counsels dealing with infringement, user's contact details and the like. Apart from this, the IP Wrapper enabled data may also include additional information and additional links field related to the know-how and rights data of the users 108.

In some embodiments, the additional links field 208 may include information related to additional details in blockchain or cloud about the rights holder 106 and their know-how, such as information about prosecuting attorneys involved with patenting, market research, videos of prototypes that embody relevant right, references about value it can provide and the like.

In some embodiments, the transaction history field 210 may include information related to contact details of the rights holder 106 and, possibly, payee details for the right holder 106 for transacting the right in fiat currency.

The transaction history field 210 may be configured to provide security and privacy to user information related to the transactions performed using the computer-enabled networked ecosystem 100. In some embodiments, the computer-enabled networked ecosystem 100 may provide support to the users 108 during various stages of the transaction. For example, transaction initiation, transaction negotiation, transaction execution, and transaction closure can be facilitated digitally through the computer-enabled networked ecosystem 100. The transaction history field 210 may include data indicative of a stage in which a transaction is at a particular instant of time. Further, since the transaction data may also include user's sensitive information, thus, to ensure privacy and confidentiality of the user information, the transaction may be carried out over a secure communication channel and the information stored in the IP Wrapper 138 may be encrypted before the transaction happens.

Figure 3:
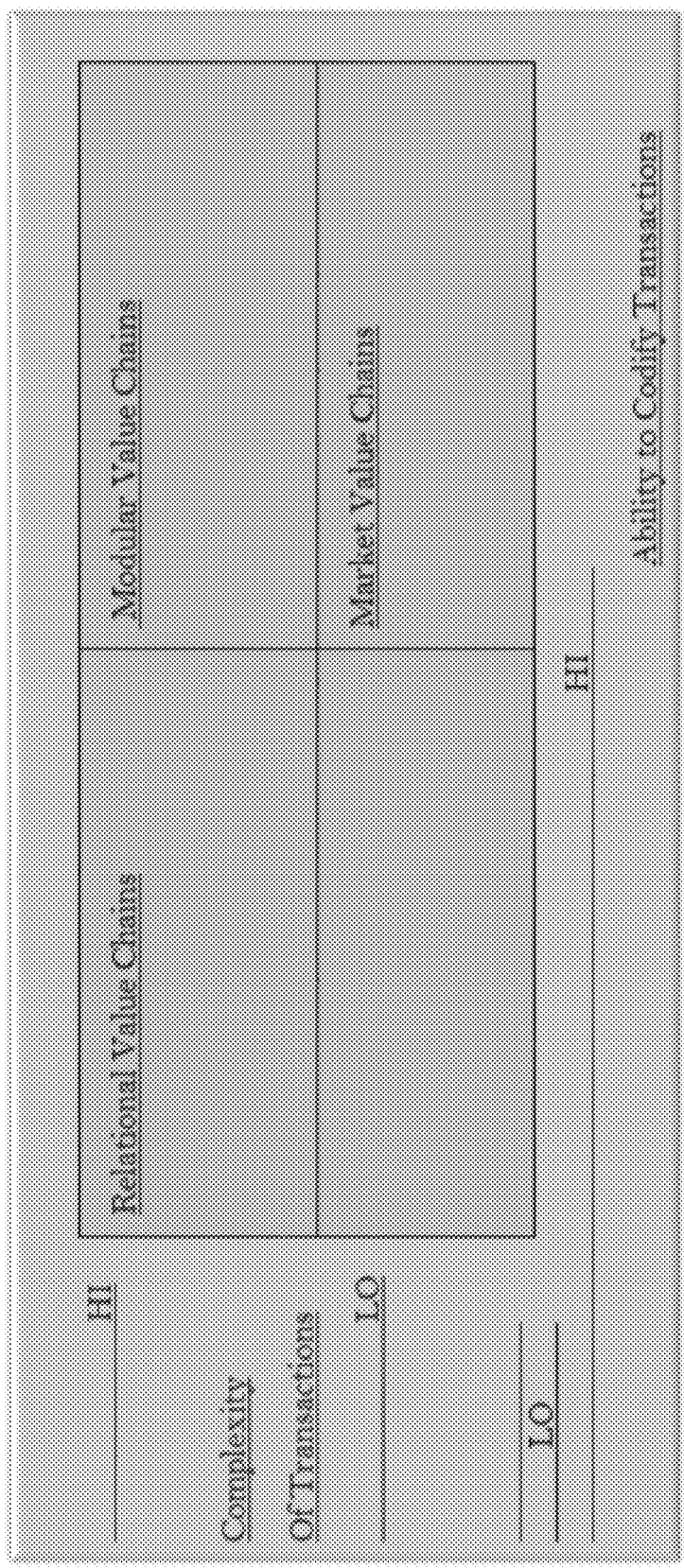
FIG. 3 illustrates an exemplary representation of an expert-based value chain in an embodiment.

FIG. 3 illustrates an exemplary representation of expert-based value chains.

In accordance with certain embodiments of the invention, in modular value chains, the holders 106 may transmit complex but codified information to the users 108 which the latter can flexibly use since many of the factors of production may involve similar infrastructure and machinery. As a result, coordination requirements that are low (LO) provided industry-specific codification standards are followed. By comparison, market value chains may involve the users 108 and less complex transactions and relational value chains involve transactions that cannot be adequately codified. Thus, modular value chains may lead to the highest (HI) premiums for the underlying IPR. By rationalizing how value is registered, transacted and enhanced, the ecosystem 100 can help correct imbalances in the allocation of the value among global value chain participants 102.

Some illustrations of such modular value chains that involve expert entities (such as firms and/or individuals) and that may be implemented through the native protocol and can transform such value chains are discussed herein.

3D printer instruction sets: 3D printing is a global industry and the know-how involved in fabricating certain 3D printed parts has historically been difficult to share. Even though such instructions could be patented, expert firms don't always apply for patents as these instructions are often modified through usage and the related know-how has historically been kept in-house.

By encoding the know-how in the IPR Wrapper 138 enabled by the native protocol and encoding digital instruction sets in a related blockchain, such firms can gain liquidity for their know-how as it now becomes tradeable across borders and disciplines. For example, the instruction sets for a surgical mesh devised by a UK based firm that is 3D printed for a cardiac application could be adapted toward printing 3D meshes for, say, Gastro-Intestinal applications by, say, an Australian firm. Because the Australian firm can now register the enhancements it may make on the original 3D printing instruction set, it can legitimately claim additional value that can be traded through appropriate mechanisms digitally via the computer-enabled networked ecosystem 100.

Algorithms for coatings (such as for certain metallurgical alloys) can similarly be encoded and made tradeable through royalty streams that accrue to specific use cases. For example, some firms with coatings know-how related to coatings inside disposable aluminum beverage containers could register and transfer this know-how to other companies who are seeking to comply with different food and beverage industry regulations in other parts of the world.

Semiconductor instruction sets (ranging from surface mounting to etching to other aspects of layers in semiconductor fabrication) can be registered as know-how and earn royalties.

Firmware instruction sets represent another category, especially for high growth industries such as robotics. In effect, firms can register their instruction sets for training a robot with, say, particular pick-and-place routines for particular industrial applications and earn royalty streams from their use.

FPGA instruction sets (cloud and server infrastructure; field programmability) for a video session for IoT and Camera/Sensor Control can similarly be registered and monetized.

Instructions for gems manufacture that instruct machines that grow crystals and lattices by regulating manufacturing process parameters such as temperature, pressure, and other materials properties and similarly interact with the ecosystem. Such instructions can be coded and made available through related IPR Wrappers 138 using the protocol.

Food processing is another massive growth area (such as in the blending of additives, or the roasting of key ingredients, or recipes related to changing the composition of fats, lipids, and proteins) where participants may interact with the ecosystem 100 and particularly the IP wrapper 138. By registering and making available their know-how for trading through the protocol, expert firms in one part of the world can capture how to roast, say, coffee or chocolate beans without having to incur the relatively high cost of patenting.

Textile and composites manufacture are similarly application areas which can spawn codification of the underlying process and materials know-how and trading through digital marketplaces enabled by the protocol. This may enable the know-how represented in various indigenous crafts to be effectively commercialized in a way that puts more money in the pockets of the artisans than in the distributors of the products that embody that know-how.

Chemical dyes, emulsions, and reagent formulation instructions can also be similarly codified and release large opportunities for royalty generation through the ecosystem 100 as disclosed in this disclosure.

Although the examples above pertain to industrial know-how or rights, the protocol can be applied to other forms of IPR too. For example, authors can register their works and make these available to, say, TV shows or journals for publication and/or enhancements. Thus, a writer penning children's short-stories may be able to derive royalty streams by registering her stories and having them become discoverable by talent scouts for TV shows. Such adoption has the potential to transform the copyright category of IPR.

Both at the point of use and at the point of enhancement, the protocol may enable the users 106 and the holders 108 to transact through the IPR Wrapper 138, which is a second primary element of the protocol.

Figure 4:
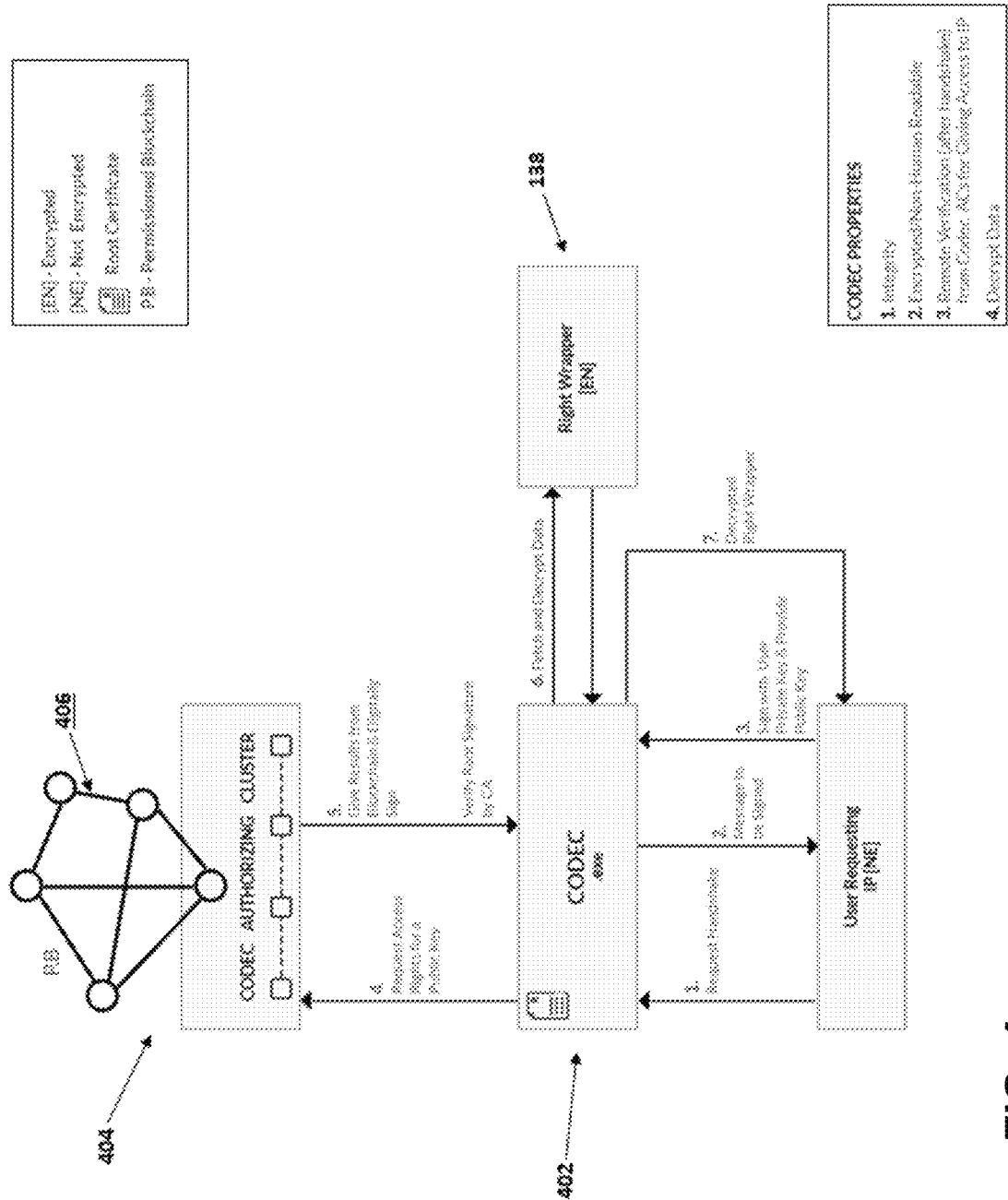
FIG. 4 illustrates an exemplary scenario of a codec associated with an IP asset in an embodiment.

In some embodiments, the specialized data structure as illustrated in FIG. 2 may embed contractual restrictions and other data in the form of a codec 402 associated with an IP asset to be transacted through the computer-enabled networked ecosystem 100. FIG. 4 illustrates an exemplary scenario of the codec 402 associated with an IP asset such as a right highlighting various codec properties in accordance with an embodiment of the present invention.

The codec 402 may be an executable file that begins execution when a request to transact an IP asset is initiated. Since the specialized data structure includes multiple fields, thus, the codec 402 may also include multiple layers. The number of layers in the codec 402 may correspond to the number of fields in the specialized data structure. As each layer is executed, multiple contractual, user identity and financial capability checks may be performed. For example, one layer may correspond to know-how usage rates in the specialized data structure and when a transaction request in initiated, the codec 402 may include code to check whether the user which is requesting possession of the IP asset has sufficient right token balance in their account to support demanded royalty rates. If not, the users 108 may be alerted to update their right token account with sufficient balance, or their transaction may be denied. Similarly, other types of checks and authentication related actions may be coded in the codec 402.

The specialized data structure's associated codec 402 may be written in any suitable programming language, such as solidity programming language, that is designed for the Ethereum platform.

An exemplary architecture of an IP wrapper codec 402 may include multiple layers. The multiple layers may correspond to such as layer 1 for data, which can be the entire IP wrapper 138, or a part of it, layer 2 can be authentication layer, where checks related to the right holder 106 and user identity may be encoded. Similarly, there can be as many layers as required for a specific IP transaction implementation. An additional feature may include disclosing each user's right token account balance when they get authorized to conduct transactions within the digital marketplace-based ecosystem 100, as a proxy for a short-term "credit" check. Further layers could comprise of "plug-ins" that automatically generate issuance of the right token 104 for the holder 106 when the user 108 initiates a pre-determined sequence of instructions for use of the related IPR or rights.

In some embodiments, the specialized data structure may embed contractual restrictions and other data in the form of the codec 402 associated with the IP asset such as the right to be transacted through the computer-enabled networked ecosystem 100. The number of layers in the codec 402 may correspond to the number of fields in the specialized data structure, in an embodiment. For example, a layer in the IP Wrapper 138 may include a layer for data related to payment processing for transactions carried out using the computer-enabled networked ecosystem 100 when a user initiates any transaction, such as paying registration fee for membership.

As each layer is executed, multiple contractual, user identity and financial capability checks may be performed. For example, one layer may correspond to know-how usage rates in the specialized data structure and when a transaction request in initiated, the codec 402 may include code to check whether the user which is requesting possession of the IP asset has sufficient right token balance in their account to support demanded royalty rates. If not, the users may be alerted to update their right token account with sufficient balance, or their transaction may be denied. Similarly, other types of checks and authentication related actions may be coded in the codec 402.

A codec authorizing cluster 404 may be provided for performing various authorization tasks so as to execute the computer executable file representing the codec 402. Each of the right wrapper 138 may be associated with its respective codec 402.

The codec 402 is configured to check whether the user 108 who is requesting access to the IP has access rights or not and whether the user 108 has bought the IP asset or not and whether payment transactions have happened for the IP asset or not, through computer executable codes. It is a type of validation protocol that has some digital properties. The codec 402 is a non-human readable file and is capable of remote access. It has the ability to decrypt the data from the blockchain 406 whenever the user 108 has acquired the IP asset associated with the codec 402 to get the wrapper 138. The codec 402 acts as a layer between the blockchain 406 and the user 108.

When the user 108 requests for the IP asset or the right, the codec 402 for the right associated with the right wrapper 138 is initiated. A handshake mechanism is triggered based on which the user 108 proves that he is the owner of the right or public address on the blockchain 406 reserved for the particular right or the IP asset. This handshake mechanism or protocol allows the user 108 to prove his/her entity. As soon as this handshake mechanism is triggered, the codec 402 talks to the codec authorizing cluster (also referred to as blockchain cluster) 404, where it is verified whether the user 108 who has proved his/her identity should have the access to the right or not. The codec 402 contacts the codec authorizing cluster 404 and the codec authorizing cluster 404 in turn returns some details to the codec 402. The codec authorizing cluster 404 signs access details of the user 108 and send it to the codec 402. The details are verified as whether they are coming from the right authorizing cluster 404. This is verified by a signature mechanism that verifies root signatures. If the user 108 is identified to have access to the right or the associated IP wrapper or right wrapper 138, the right is pulled from a database storing the right and decrypted by the codec 402. Codec 402 has a decryption key that performs decryption of the right for display and presentation or messaging to the user 108 digitally. The decryption key is a non-human readable executable binary code.

Figure 5:
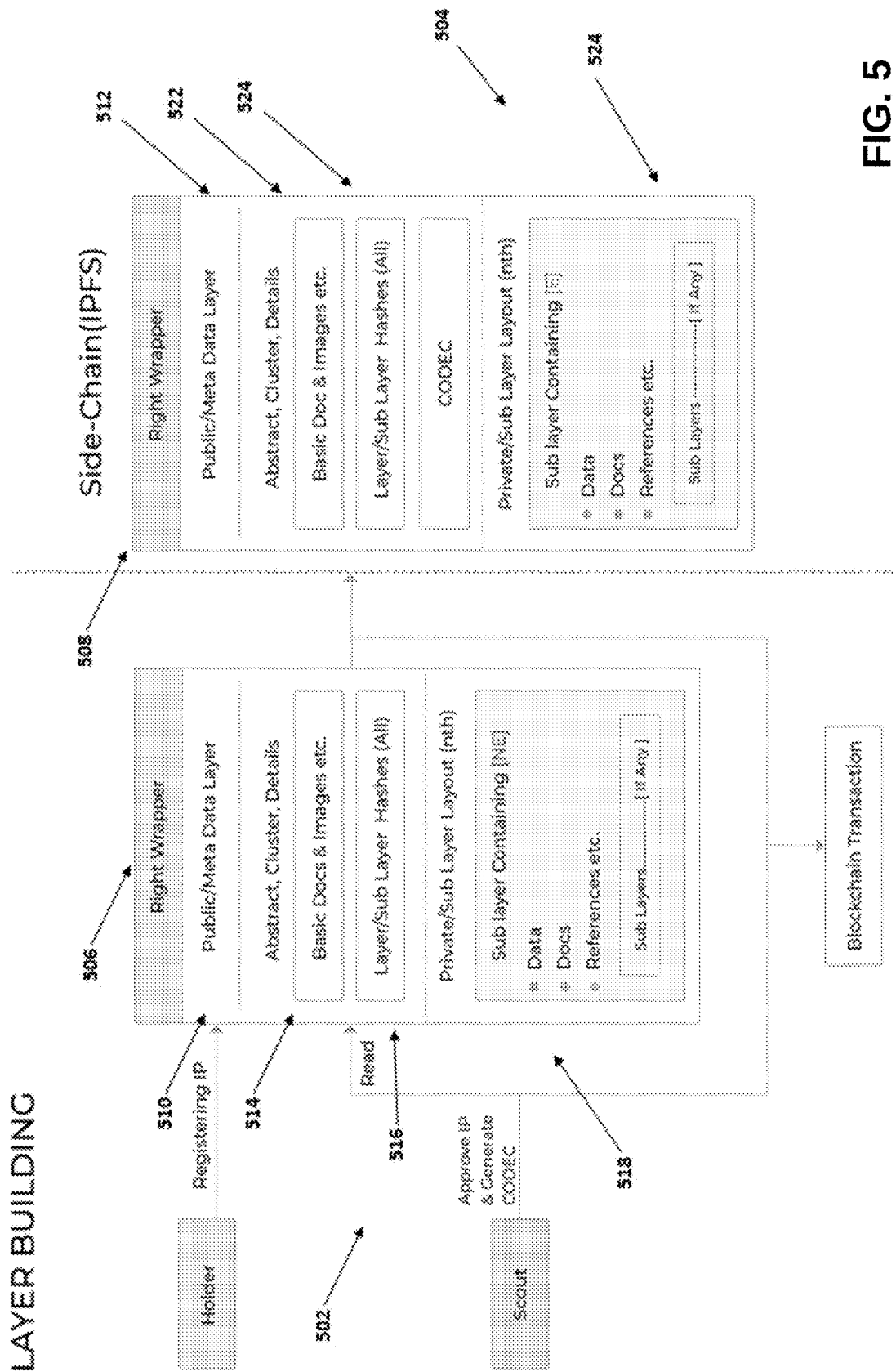
FIG. 5 illustrates a multi-layered structure of managing an asset wrapper (IP wrapper) over blockchain in an embodiment.

FIG. 5 illustrates a multi-layered structure of managing the IP wrapper or the right wrapper 138 (used interchangeably without limitations) over the blockchain 406.

The layered structure may be divided into two layers as an example shown in FIG. 5—a blockchain layer 502 and a side chain layer 504. The right wrapper 138 may include two instances—a first right wrapper instance 506 stored in the blockchain layer 502 and a second right wrapper instance 508 stored in the side chain layer 504. The first right wrapper instance 502 may include a first metadata layer 510 that may store all the metadata and keywords of the information contained within the right wrapper 138. Other actual entire details such as the rights may be stored in a second metadata layer 512 of the second right wrapper instance 504. The information contained in the first right wrapper instance 502 may include such as computer-executable rights information at a metadata level associated with such as abstracts, cluster, and other right sections, basic documents, images, etc. collectively illustrated as 514. The first right wrapper instance 502 may further store a sub-layer or layer for storing hashes 516. The first right wrapper instance 502 may further allow an extendible layer template (called a sub-layer layout) 518 to create more layers to contain such as digital data, references, and other documents etc.

The second right wrapper instance 504 may include the second metadata layer 512 to stole information in the same way as stored by the first right wrapper instance 502. This information may include such as metadata associated with abstracts, cluster and other sections of the right collectively shown as 522. This information may be contained in the form of basic documents stored digitally, digital images, etc. The second right wrapper instance 504 may also include a layer/sub-layer for storing the hashes 524. The second right wrapper instance 504 may store the codec 402 so as to refer to the entire rights referencing to entire information associated with the right for full access. While the first right wrapper instance 502 may only store the keywords and the metadata level information, the second right wrapper instance 504 may store the rights and the associated codec 402.

The second right wrapper instance 504 may further allow an extendible layer template (called a sub-layer layout) 526 to create more layers to contain such as digital data, references, and other documents etc.

When the right is registered by the holder 106 on to the blockchain 406, it is first associated with the blockchain layer 502 and then pushed to the side chain layer 504. The codec 402 for the right may be generated when the miner or the scout 110 approves the right for various pre-determined criteria.

Figure 6:
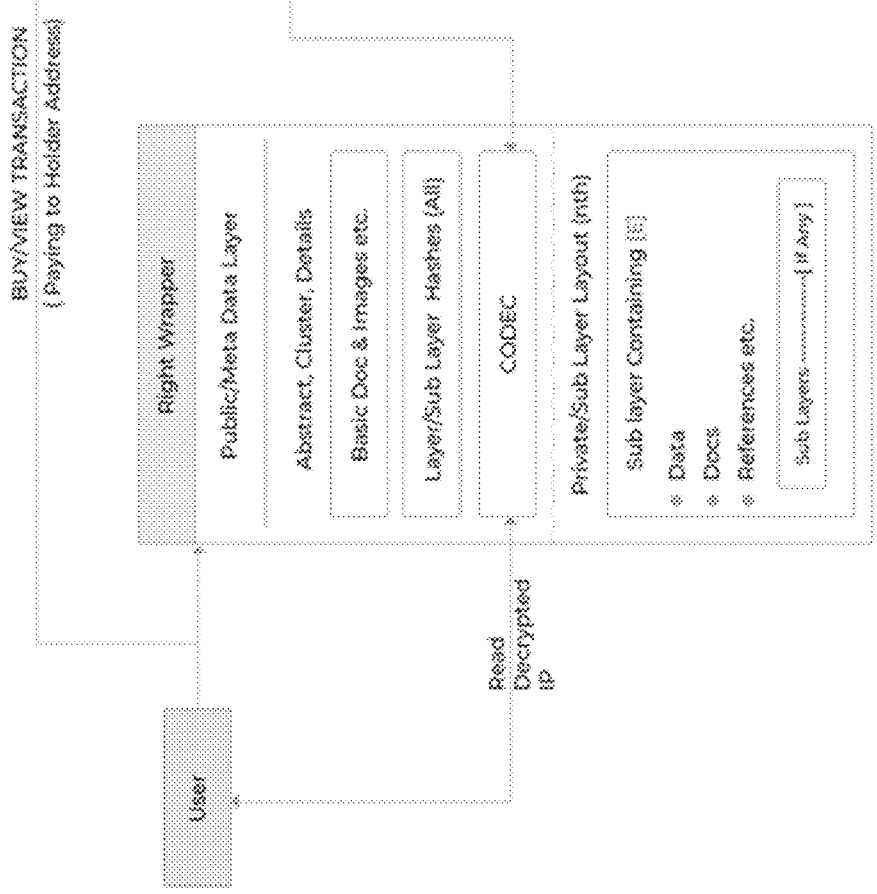
FIG. 6 illustrates another view of a blockchain-enabled infrastructure powering an ecosystem in an embodiment.

FIG. 6 illustrates another view of a blockchain-enabled infrastructure powering the ecosystem 100. As shown, the codec authorizing cluster 404 may be communicatively coupled to a permissioned ledger 602 and a right token ledger 604. The permissioned ledger 602 may be communicatively connected to a plurality of public nodes 606. The codec 402 talks to the permissioned ledger 602 through the codec authorizing cluster 404. The right token ledger 604 and the permissioned ledger 602 may allow committing every transaction on the blockchain such as whether payments and/or view rights are given and the like. The permissioned ledger 602 is configured to give the codec 402 permission and access rights. The right token ledger 604 is configured to allow transactions involving payments etc. The right coin token ledger 604 is a public ledger of the blockchain 406 which holds the fungible right tokens 106 and has certain value to it in the form of the right tokens 106. The permissioned ledger 602 allows registering the rights (non-payment related information) with the blockchain 406.

The public nodes 606 define extension of the permissioned ledger 602 to allow anybody to host a node. This allows people and systems to be part of the ecosystem 100 even if they are not active participants and do not have payment or transaction permissions. The public nodes 606 may include decentralized systems that can be replicated at multiple instances. A host of the public nodes 606 can sync the data with the permissioned ledger 602. The public nodes 606 may allow reduce the number of transactions on the permissioned ledger 602 to avoid bulkiness. This may give an ability to avoid spamming etc. and control the transactions directly through the permissioned ledger 602. The public nodes 606 may involve infrastructure, hardware and software capabilities.

The ecosystem 100 may be enabled through blockchain technology, which may offer rewards to the holders 106 of the know-how based on the quality of their know-how history and the number of know-how submissions to the network of the computer-enabled networked ecosystem 100. The holders 106 may receive payments for views of their know-how and such payments may increase through (say, a Fibonacci or other sequence/algorithm) which considers several views, timing between views and other factors. By way of example, following is a simple Fibonacci sequence that can be considered for calculating incentives:

A first viewer may be asked to submit a "micro-payment" of, say, x right tokens.
A next viewer of 1x right tokens.
A third viewer of 2x right tokens.
A fourth viewer of 3x right tokens.
A fifth viewer of 5x right tokens.

This Fibonacci sequence-based payment regimen is only one of many potential payment sequences that may be "wizard-driven" and may be adopted by the holders 106 that tie to their specific application set. Certain holders may choose to have a "First Licensor Takes All" approach where the first viewer of, say, a trade-secret may enjoy advantages over other viewers as they get in early and comp the value to the next viewer may be much reduced as the related secret has now been disclosed to a competitor. Similarly, other "Wizards" for use by the holders 106 that could include level-loaded, barbell shaped, and multiple other allocation schemes may be programmed.

The holders 106 who receive multiple views that generate a certain holder-specified threshold of micro-payments may receive an incentive to further protect their know-how through a provisional patent application and be provided with a template and AI-driven tools or simply AI tools for filing such an application and/or be referred to as the miners or scouts 110 with specialized expertise in the subject matter implicated who may then help with patentability and provisional patent protection digitally, as necessary.

Additional incentives may be considered in the form of the right tokens 104 as credits, coupons for conferences, premium platform feature access, and others. The system 100 may provide volume-based incentives to encourage transactions between the holders 106 and the users 108. For example, when a holder 106 negotiates their know-how based on information encoded in an IP wrapper 138 transactions, the holder's account would be debited with a predetermined right token 104 balance. In this way, the ecosystem 100 may align its interests with those of the holders 106.

Along with other services, the miners 110 may earn micro-payments for validating and verifying rights registered with the system 100. In effect, if a miner 110 discovers that a right has been registered previously within the ecosystem 100 or has a patent pending or granted, then they can provide links to that "prior art" and flag this issue. Other miners independently "score" the right along dimensions that relate to novelty and non-obviousness and earn micropayments for providing these scores digitally. The system 100 may generate statistics (mean, standard deviation) of these scores and associate these with each right. In effect, this may provide an ingenious approach to "crowd-sourced" IP validation—as other users and miners may review the associated IP Score in their evaluations of that right. Over time, these IP Scores could stand-in for patent filings and may well induce their holders 106 to file for patent protection as they would have obtained a low-cost assessment of patentability from the crowd of the miners 110.

Such a process may enable the holders 106 to have an efficient mechanism for safeguarding their rights at a fraction of the cost of patenting options. It can also be used to ferret out prior art for "patent-busting" or for validating the uniqueness of a right.

Various benefits as provided by the disclosed ecosystem 100 without limitations are discussed herein.

The purpose of building this transparent, secure, on-line, digital, and immutable platform 100 tied to blockchain technologies is that it may provide a game-changing basis for growing and capitalizing on the know-how. With innovation cycles shrinking, we are at a point in economic history where the value of the "unused" or "under-used" IP in most organizations is vastly greater than the patents and tangible IP manifestations that are in use in that organization's current products and services. Such IP walks out the door when organizations experience turn-over. By committing this know-how to the blockchain, organizations and individuals can develop and capitalize [literally, "mint"] their know-how in ways that have rarely been experienced in markets for know-how and intellectual capital through technology-enabled and hardware controlled systems and devices.

Figure 7:
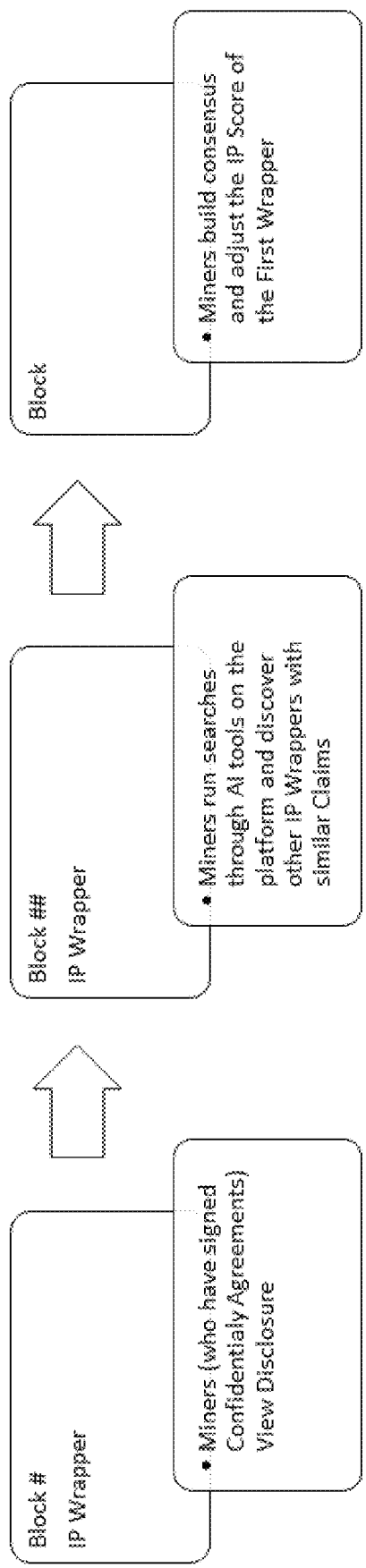
FIG. 7 illustrates an example of overall mining process in an embodiment.

FIG. 7 illustrates an example of overall mining process in an embodiment. The various components of the mining process include such as discussed herein.

Discovery: Organizations can discover the know-how that is latent within their employees and contractors and individuals can get discovered for know-how that they possess whether they are associated with an organization or have moved on to other jobs or retired in a digital framework enabled through the computer-enabled networked ecosystem 100.

Cross-Pollination: The system 100 may help build semantic search and connection technologies that may allow the rights holders 106 to connect with other rights holders and prospective rights users 108 in a pro-active rather than reactive mode. The world is swiftly moving toward an "on-demand" labor market where particular know-how and talent will increasingly need to be available closer to the point in demand rather than in longer-term employment contracts. Thus, it will become incumbent upon talented professionals with specialized knowledge and skills to make themselves known to search engines and algorithms which will increasingly replace head-hunters and intermediaries.

Transaction: Similarly, "smart contracts" may help power this new on-demand economy—particularly in competitive R&D situations where high quality labor and talent remains scarce. Such contracts may be triggered by "spot markets" where a particular piece of know-how is sought after for a stipulated time period and with that the know-how can bid for certain jobs, apply for particular prizes/cash awards in hackathons and open innovation challenges digitally. In addition to these supply-driven markets, there may also be demand-oriented markets where "fans" will follow the work of a particular inventor, musician, or designer and be willing to "pledge" monies toward their next works. This may allow talented creatives to crowd-fund their creative work through the ecosystem 100.

The system 100 may facilitate to create a format that can become an Open Standard for the industry for how the know-how is recorded, registered, contracted, and used digitally. In an example, several other on-line marketplaces for talent, IP, rights, crowd commerce, and collaboration may need a format for representing and safe-guarding the know-how. By promoting the protocol as the open "industry standard," the system 100 may profit from the exponential growth in the need for liquidity in IP markets that the world may experience.

In particular, the ecosystem 100 may offer distinct solution sets for different industries that encode key regimes around licensing the rights in that industry and tie to the digital industry marketplaces that may utilize the native protocol. By way of example, the licensing between companies of finished varieties and germplasm containing transgenes for the crop industry can be significantly enhanced through template-based systems for facilitating licensing of traits and varieties. The protocol may provide such template based standards with interactive decision trees that may allow the holders 106 to instruct a "wizard" for generating a contract based on factors such as (1) Country of Use; (2) Commodity/Crop; (3) Farm Size; (4) Farm Income; (5) Royalty Stacking Issues; (6) Warranties; (7) Third Party Distribution Factors; (8) Import/Export Matters, and other such considerations.

Such a template may be distinct from a similar template for licensing semiconductor fab know-how or pharmaceutical licensing or FRAND licensing structure for telecommunications, By codifying and linking such licensing knowledge to normative "best practices" in specific industries, the ecosystem tends to improve and accelerate access and cross-pollination of inventions and IPR. This may address systemic biases and imbalances that prevent developing countries from benefiting from advances in technology and simultaneously restrict their equitable participation as contributors to global IPR in such countries. This may greatly streamline licensing in arenas such as listed herein below without limitations:

Resource-poor farmers in developing countries are often left behind due to controversies on how to transfer protected crop varieties and biotech inventions to such countries.

Pharmaceutical and nutraceutical companies from developing countries can't effectively share and exchange insights and innovations with researchers and inventors in industrialized country institutions.

Marketplaces for certain IPR may allow developing country innovators to trade the know-how that they customize for their countries with other developing countries. Initial use cases can be developed within "certified partner" ecosystems of major global ICT makers (such as Microsoft, IBM, Apple, and others) where a telemarketing software from another country built on the operating system of a major telecoms company may find application in, say, a call center from yet another country.

By tying payment models to the transaction types that are implicated within such licensing templates, the ecosystem may offer the users and the holders an unprecedented reduction in the friction associated with such transactions. Thus, the protocol codecs may tie different payment models to:

Exclusive or partially exclusive licensing contracts digitally;
Pooling of the rights digitally;

Technology transfer agreements digitally;
Options arrangements digitally;
Syndication of the rights digitally.

Pricing of such IPR-related smart contracts may be based on both algorithmic and expert-based models. The expert-based models may involve the miners (as experts) 110 offering normative pricing guidelines for classes of transactions within certain industries. The algorithmic pricing may rely on the AI-tools 146 which may be built and integrated into the protocol for proposing price bands based on comparable transactions and measures of IP and commercialization intensity in specific industries. For example, smartphone related technologies and patents may be scored differently than innovations, say, in the leather goods industry given that the largest patenting related spend in the world's largest industrialized economies today is in smartphone related innovation.

In some embodiments, the computer-enabled networked ecosystem 100 may be configured to provide a secure, on-line, and immutable platform built by using blockchain technologies at the back-end. The blockchain technology may be used to provide a secure ecosystem for capitalization of the know-how and the IP assets or rights, which remain mostly unused in most organizations. Though the know-how or rights is more than just patents and tangible IP manifestations used in an organization's products and services, still it is mostly neglected. Blockchaining of such know-how may help the organizations as well as individuals to develop and capitalize their know-how and intellectual capital in general.

In some embodiments, the blockchaining of the intellectual (IP) assets may also assist in the discovery of the know-how within the organizations. For example, an organization may possess know-how latent within their document pool, which may be provided by their employees, contractors, past and retired employees and the like.

In some embodiments, the blockchaining of the intellectual assets may also assist in cross-pollination. The computer-enabled networked ecosystem 100 may provide a technology for building semantic search and connections. This technology may allow the rights holders 106 to connect with other rights holders and the prospective rights users 108 in a pro-active mode, rather than reactive mode. The computer-enabled networked ecosystem 100 may be configured to provide an "on-demand" labor market where particular know-how and talent may be made available closer to the point in demand rather than in longer-term employment contracts.

In some embodiments, the computer-enabled networked ecosystem 100 may also help the members 102 in their job search and head-hunting efforts by providing a search engine capability and specialized algorithms enabling discovery of talented and skilled personnel.

In some embodiments, the computer-enabled networked ecosystem 100 may enable performing transactions over the platform bounded by "smart contracts" technology. Smart contracts technology may be specifically beneficial in situations where a member may be seeking for spot market opportunities. For example, in a particular situation, a particular piece of know-how may be sought after for a stipulated time period. The know-how may be used for bidding for certain jobs, applying for prizes or cash awards in hackathons and open innovation challenges, all through the computer-enabled networked ecosystem 100. Additionally, the computer-enabled networked ecosystem 100 may be configured to provide an opportunity to certain members to follow the work of a particular inventor, musician, or designer and be willing to "pledge" monies toward their next works. These monies may be pledged in denominations of the right token 104. This may be used to enable crowd-funding of creative professionals' work through the computer-enabled networked ecosystem 100.

In some embodiments, the computer-enabled networked ecosystem 100 may provide a standardized framework for recording, registering, contracting, and using of know-how digitally. For example, the architecture of the computer-enabled networked ecosystem 100 may be replicated by other on-line industry marketplaces for safeguarding the IP assets, such as rights documents, crowd commerce records and the like. These assets may be stored in the IP wrapper 138 format provided by the computer-enabled networked ecosystem 100.

In some embodiments, the computer-enabled networked ecosystem 100 may be configured to provide an analytical tool 148 for digitally analyzing and generating data and reports for trends, transactions, and developments in rapidly evolving industry clusters organized digitally and executed through computer-executable codes and/or files. The analytical tool 148 may be used to integrate capabilities related to understanding, assessment, valuation, and provide foresight for know-how and technology-related data. The analytical tool 148 may be accessible on the payment of a fee, such as a fee paid by using the right tokens 104.

In some embodiments, the analytical tool 148 may be used to access analytical systems for understanding patent landscapes and perform advanced searches digitally for particular know-how, such as for use in "patent-busting" or infringement analyses in a graphical manner controlled by necessary hardware systems and hardware-based analytics systems.

In some embodiments, the analytical tool 148 may be used to connect with the miners 110 for assessing patentability and/or trademark protection related projects from some of the members 102.

In some embodiments, the analytical tool 148 may be used to access the artificial intelligence (AI) tools 146 for assessing patentability and/or trademark protection related projects from the members 102.

In some embodiments, the analytical tool 148 may be used to gauge valuations of particular rights by leveraging machine-learning algorithms 150 provided by the analytical tool 148. The valuation may be used to obtain a comparative analysis of transactions, analyses of the holdings of other key competitors in a cluster, and "white spaces" for value creation.

In some embodiments, the analytical tool 148 may be used to provide social insight and foresight related data and information for a particular technical issue. For example, the analytical tool 148 may be used to collate insights from scientists, which may be the network members, about a topic of interest such as neglected diseases. Such insights may be useful in addressing issues of global relevance such as may be used for developing new anti-viral compounds by companies looking for aggregated insights related to their new product.

For a fee (paid in the right tokens), the members 102 may also access key collaboration tools that enable them to host such as the following framework components 114:

Collectives: These are special interest groups where the members 102 can access features to exchange documents, audio, and video files, engage in group-chat and messaging, organize themselves into syndicates to access funding or respond to challenges, etc. digitally.

Crowd-sourcing: These may be digitally hosted programs sponsored typically by institutions or corporate members who may be seeking to leverage the know-how embedded in the ecosystem 100 network for spurring innovation. Several challenges that may be hosted by the sponsors on the ecosystem 100 may include such as responding to requests from developing countries for energy efficient water desalination and leakage control and other technologies without limitations. Other crowd-sourcing initiatives may be launched to seek to source medical device innovations for certain intractable problems that may have led to lawsuits related to complications experienced during surgical procedures.

Crowd-funding: It enables the holders to seek "pledges" from other members for their creative work digitally. Examples of crowd-funding projects that may be developed may include enabling classical musicians to fund new artistic work through pledges of the right tokens 104. In return the artists may provide funders with early recordings, T-shirts, and memorabilia etc.

Digital Marketplace: The ecosystem 100 may also provide a digital marketplace where the holders 106 and the users 108 can offer and seek the know-how. Over time, this marketplace functionality may grow to enable syndication, pooling, and collateralization of the rights. It may also benefit from the AI algorithms 132 that autonomously may help the members 102 connect with offers and requests (based on their stated preferences) that may allow, say, a patent transaction to benefit from attracting a complementary bundle of the know-how or an expert being plugged into a fast-developing deal given her past experience and reputation with, say, licensing of certain types of the assets.

The disclosed ecosystem 100 may be a block-chain powered ecosystem built for generating liquidity from the rights. Because it is blockchain-powered, it may "natively" enable decentralized models for growth and governance, and the related AI (artificial intelligence) and algorithmic capabilities to enable "on-demand" access to the relevant know-how. The core mechanisms that the ecosystem 100 utilizes for mobilizing liquidity may include such as without limitations:

Appreciating Store of Value: An early stage innovation can be hard to "value" in real terms given that it can be quite complicated to evaluate its legal, economic, and operational implementations at a nascent stage of development. It is hard project how the claims of even its patented manifestations would play out among other claims (especially, in densely populated and rapidly evolving patent landscapes), difficult to know what kinds of marginal economics that innovation would drive, and often challenging to speculate on the multi-factorial organizational and societal implications of operationalizing early stage ideas. The protocol may turn this dynamic on its head by allowing innovations to be "traded" for the right token 104 that may have intangible value. In effect, an inventor may choose to trade-in her innovation for tokens whose value may appreciate much faster than their "fiat-currency" value. By way of example, if a painting is sold for USD 1000 today then that thousand dollars will likely have the same value in one year as it does today. However, if that painting is exchanged for, say, 10,000 right tokens 104 then the artist has a reasonable likelihood that those right tokens 104 will be worth much more in one-year than they are today.

This value appreciation of the token 104 comes from two factors (1) the growth in the value of the market-network which may be available to the token holders 106 as that network expands and reaches more members, encompasses more features, and the demand for membership surges and (2) the dynamics of operating with a fixed supply of the tokens 104 which may lead to conversion rates between the tokens 104 and fiat currency rates to increase as demand increases when the supply of the tokens 104 is fixed.

Thus, over time numerous innovators and especially early stage innovators may prefer to hold the right token 104 rather than their innovation rights. These innovators may prefer to negotiate sooner for lower right token prices than hold out for larger fiat-currency prices as they may realize that they may be better off by accepting a lower right token price today that may escalate more significantly than the fiat-currency value that their innovation may fetch a year down the road. In expect, the right token 104 can foster a growing liquid market for the know-how.

Web of Association: Lawyers who may have been involved with prosecuting a patent may be flagged by the patent holder as having been associated with the patent, who must provide email and contract information for such associated parties. Such associations can be verified by these professionals who receive automatic alerts of them being associated with a right that has been registered on the platform 100. Similarly, a designer can put his industrial designs on-line through the blockchain enabled ecosystem 100 and offer references for his or her past work to clients who can become available to other users interested in availing that design. This ease of access to the ecosystem 100 around a creative or right significantly reduces friction around asset transactions and enhances trust through a network effect like social platforms such as LINKEDIN®.

Incentives for Rights Registration: In addition to the incentives mentioned in an earlier section, the holders 106 who register their rights can also receive "bonuses" that can be tied to the overall "velocity" of the right token economy as measured by indices such as number of rights listed, overall and cluster-specific transaction volume, average size of transaction, days from a view to a transaction, and others. The sponsors 122 who are running "innovation on-demand" or "crowd-sourcing" challenge programs may thus be able to reward purveyors of more mature technologies that have a "proven" set of rights more strongly early stage concepts where the value of the underlying rights is subject to speculation.

Pooling and optioning: A token-based economy may enable a series of levers to unlock value from under-utilized IP. The system's algorithms can propose pricing "bands" [based on an analysis of past transactions (outside the system marketplace) and other transactions occurring in the marketplace] that may enable the holders 106 to choose from a drop-down menu to option out their rights for a designated time-period. Such an option would provide an "exclusivity" covenant to enable the parties to the option transaction to negotiate the price for the underlying asset by some specified future date. Such a holder would then be assured of receiving the appropriate option price at the time of creating such an option and a further price (that may be subject to future negotiation based on their interests). By denominating the price for these options in the right token 104, one can obviate the need for lengthy or cumbersome negotiations and as a result expect that millions of rights holders whose IP is currently under-utilized may choose to initiate such options offerings. These may include without limitations university tech-transfer offices, solo or small business inventors, and even large corporate entities who are often utilizing only 20% of their IP holdings for operational purposes. By creating these options on "dormant" assets and receiving consideration through the tokens 104, the "valuation" of these assets may be deferred to a subsequent time-frame which may have strong economic benefits. For example, a university who options out a telecoms related patent portfolio and receives, say, 100 right tokens 104 based on the prevailing pricing band for such assets can put off the decision for how to price a license for the same assets until more information about market behavior and technology progress comes to light. This may be invaluable in a range of early-stage technology situations.

Of course, the mirror image of the option feature also allows the users 108 to pool assets without offering a known "market price" but simply utilize the tokens 104 to denominate that the holders 106 of the assets in the pool have a participation right in the proceeds from the ultimate disposition or licensing of assets in the pool. This enables new forms of bartering and syndications around the IP assets that help magnify the breadth and depth of the transaction marketplace and generate liquidity for all participants much as similar mechanisms have done in other financial markets.

Transactions across space-time: In a world which is increasingly global, a band of musicians in an economically unstable country may prefer to receive incomes from the right tokens 104 that is not subject to the same exchange control or hyper-inflationary regimes as the ones in which they may be located. Similarly, a headhunter may choose to buy an option on a talented software developer's expertise in the early days of that developer registering that Know-How in the right token 104 and effectively bet that the price she pays today would be a fraction for what that developer's Know-How may be transacted for in the near future. Such mechanisms enable the users 108 to purchase "insurance" against future supply imbalances just as they enable the holders 106 to purchase insure against exchange rate or regulatory devaluations of the value of their Know-How.

Off-Platform Transactions: That links to elements of their IP Wrappers 138 and their registration profiles on the system may become a "badge" of honor for several holders. They may embed these links in other popular social media channels, such as YOUTUBE®, FACEBOOK®, LINKEDIN® and others and "virally" propagate interest and awareness of their rights. For example, an inventor may choose to embed on other social media a video about their medical device on their IP Wrapper 138 and a badge which documents that they are a "Platinum Level" right token 104 earner and/or a "Five Star" IP Score Holder. This may in turn drive traffic to their inventions as these badges may invite attention and curiosity from other creatives. The ecosystem 100 also referred to as the platform 100 may provide a convenience system of social media "badges" that may be embedded for enhancing the network effect and liquidity of its asset base.

FIG. 8 illustrates architectural components of the ecosystem 100 in accordance with an embodiment. The ecosystem 100 may include the following components without limitations.

The ecosystem or system 100 referred interchangeably may include an individual and organization identity verification system 802 and a private key wallet 804. The ecosystem 100 may require all the users (individuals and organizations) 108 to be identified. This may involve creating a verifiable digital identity profile attached to a blockchain private key 806. The profile may require scanning of identity document(s) as well as biometric checks. Biometric and identification data may not be persisted on the blockchain 406, although signed independent proofs of validation (attestations) may be persisted in verifiable form. Where pre-validated portable identity exists on chain this may also be accepted (e.g. third party application provides verifiable identity profile attached to the blockchain private key 806).

For organizations represented on the platform 100, it is expected that at least one system will administer an account on behalf of the organization. Proof of association and role within the organization will be required and may involve attestation by other individuals within the same organization.

The ecosystem 100 may further include a browser based web application 808. The browser-based web application 808 may act as the main portal for all search and registration activity on the system 100. The web application 808 may be architected as a standard cloud based application, and may not contain any blockchain private key 806. As such, if a web server or other type of server 810 and its associated infrastructure were compromised it would not reveal any secret user data, nor enable the perpetrator to act on behalf of any users, nor modify their data on the blockchain 406.

Any activity enacted by a user in the web application 808 that requires a transaction on the blockchain 406 may require their blockchain private key 806 stored in their wallet 804. Similarly any data that is encrypted and only available to specific users may require the private key wallet 804 in order to encrypt/decrypt the data. A compromise of the web application server 810 may not grant access to the encrypted data.

For convenience, subject to security testing and audit, the web application 808 may include the wallet 804 such that the wallet 804 may be a browser-based wallet. This may be stored locally on the users' device and require a password to decrypt and use. Similarly, other methods may be used to provide local encryption/decryption of data without requiring the user private key to reside on the server 810.

The system 100 may include a mobile application 812 and a mobile wallet 814. The mobile application 812 may act as the primary identity and token wallet for users 108 of the system 100. A user installing the mobile application 812 on their device may be required to provide identity and biometric proofs that may then be associated with the private key created on their device. Biometric proof may be identified through a biometric recognition device 816 coupled to the system 100. Other recognition devices may also be provided in various embodiments.

The mobile application 812 may enable the users 108 to confirm, sign and send transactions digitally to the blockchain 406. This may include confirming registration, storage, updates and transfer of IP as well as other important information captured on the blockchain 406. Similarly, user data may be encrypted and decrypted using the mobile wallet 814.

Initially a mnemonic representation of the user's private key may be provided for offline backup and recovery in case of loss of device.

The ecosystem 100 may include a blockchain device 818 to execute blockchain smart contracts 820 for workflow to drive token movement. A series of token driven smart contracts 820 may be used to manage the IP registration and transfer process digitally over the blockchain 406. These will incorporate things such as an IP Wrapper structure associated with the IP wrapper 138, transaction/purchase/licensing workflow, right token transfers to grant access to the rights or IP, and reward the holders, management of IP data privacy driven by user's private key in the mobile wallet 814 and/or the private key wallet 804, and account identity proofs.

An identity contract (and associated identity proofs) may be required for every account that sends a transaction. This may ensure that only identified parties are partaking in the system 100.

The transfer of the rights token 104 into or out of the smart contracts 820 of the system 100 may be restricted to accounts with a verifiable identity contract. In other words, the right tokens 104 may only be accepted from the private key wallet 804, and only for accounts that have a valid, verifiable identity smart contract 820.

Similarly, IP ownership may be recorded in the smart contracts 820 of the system 100, and transfer of ownership may only be permitted when the owner of the IP sign, using the private key in their private key wallet 804, and upon transfer, the tokens 104 may be received into their mobile wallet 814 enabled by the system 100 (called the system wallet or the mobile wallet 814).

As with any ERC-20 token, the right token 104 may be transferred to/from other wallets outside the system 100, in an embodiment.

The smart contracts 820 may be defined in solidity and deployed to an Ethereum blockchain. If the public Ethereum blockchain where the ERC-20 token resides is able to process the forecast volumes of transactions for the system, then the entire suite of smart contracts 820 may be deployed to a public blockchain.

If the public blockchain cannot process the required volumes, then a private blockchain network supported by the ecosystem 100 may be established, and token movement may be secured using an interchain protocol (Parity bridge, Polkadot, Interledger etc.).

The ecosystem 100 may include a document storage device 822. The document storage device 822 may store documents related to the user rights in an encrypted and a distributed data storage method (IPFS, Swarm or similar).

The value of the right token 104 may be based on the principles of economic supply and demand. Below are outlined key factors that may be used to influence these economics, in an embodiment.

A fixed number of the right tokens 104 may be distributed to consumers for payment support.

Activity-based charges (based on such as a starting rate of USD 0.083 per 1.00 right token rate for example) to use the network of the system 100 by the members 102 and based on the following initial pricing matrix may be considered. This pricing and transaction charge may be revised and updated through dynamic mechanisms and is considered herein has an example without limitations.

| ACTIVITY | UNIT OF MEASURE | TRANSACTION CHARGE (Right Tokens) |
|---|---|---|
| Minting Each IP Wrapper (i.e. publishing unregistered rights through the Platform) | Per Wrapper; Coins (or right tokens referred interchangeably) | 1000 |
| Views Received by Each IP Wrapper | Per view; Coins | 20 |
| Validating Rights in Each Wrapper (includes citing prior art and providing other comments about novelty, non-obviousness, and patentability) that updates an IP Score | Per Right; Coins | 200 |
| Transfer of Know-How from one member to another member or sponsor (including patents, trade-markets, designs, trade-secrets, technology or related assets) | Percentage of Transaction Value | 5% |
| Access to Collectives | Per User/Per Collective; Coins | 10 |
| Access to Analytics Tools | Per Tool/Per Year; Coins | 2000 |
| Transactions completed through the Marketplace | Percentage of Transaction Value; Coins | 5% |
| Promoting Sponsored Content | Per Member Targeted | 1 |
| Facilitating Sponsored Crowd-sourcing and Crowd-funding | Percentage of Sponsorship Value | 20% |
| Services provided by Miners | Percentage of Transaction Value | 5% |
| Reputational score provided to a Member | Coins | 1 |
| Follow-through on Connection requests (to encourage members to respond to queries from other members) | Coins | 1 |
| Posts made to ecosystem network that receive 3-star rating by other members | Coins | 2 |

-continued

| ACTIVITY | UNIT OF MEASURE | TRANSACTION CHARGE (Right Tokens) |
|---|---|---|
| Posts made to ecosystem network that receive 2 star-rating by other members (Posts that earn no stars or 1 star will be removed after 36 hours) | Coins | 1 |

Figure 9A:
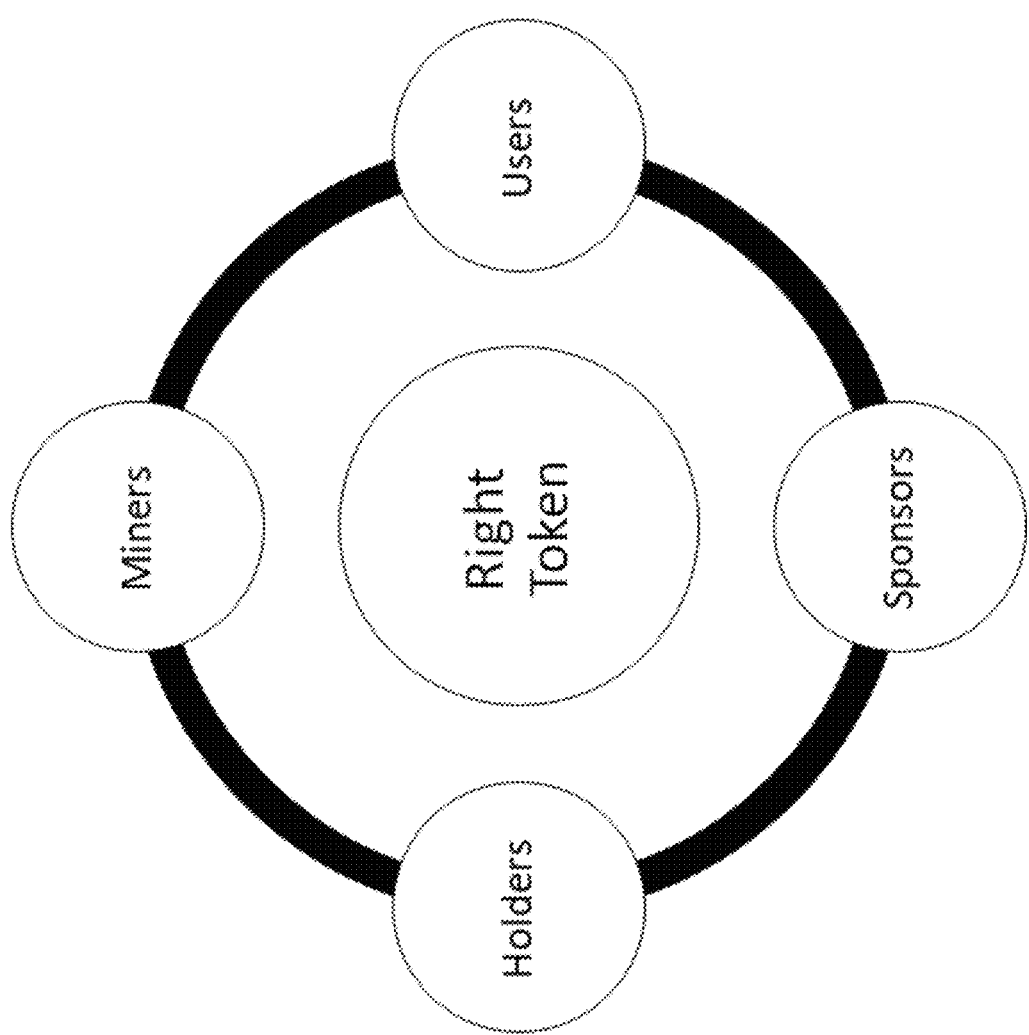
FIG. 9A provides an overview of native protocol participants such as the members in an embodiment.

FIG. 9A provides an overview of native protocol participants such as the members 102. The right token 104 may enable the rights to be traded between the holders 106 and the users 108 through the ecosystem 100 facilitated by the miners 110 and the sponsors 122 who catalyze such exchanges. In an embodiment, the right token 104 (also referred to as token or simply right coin interchangeably) may be used through the ecosystem 100 for transactions focused on science and technology based exchanges digitally. In some embodiments, the token 104 itself may have currency in markets that may extend to multiple creative domains. In an embodiment, the token 104 may be an open standard for exchanges related to the rights related to designs, works of authorship, and digital media not just patents and trade-secrets.

Figure 9B:
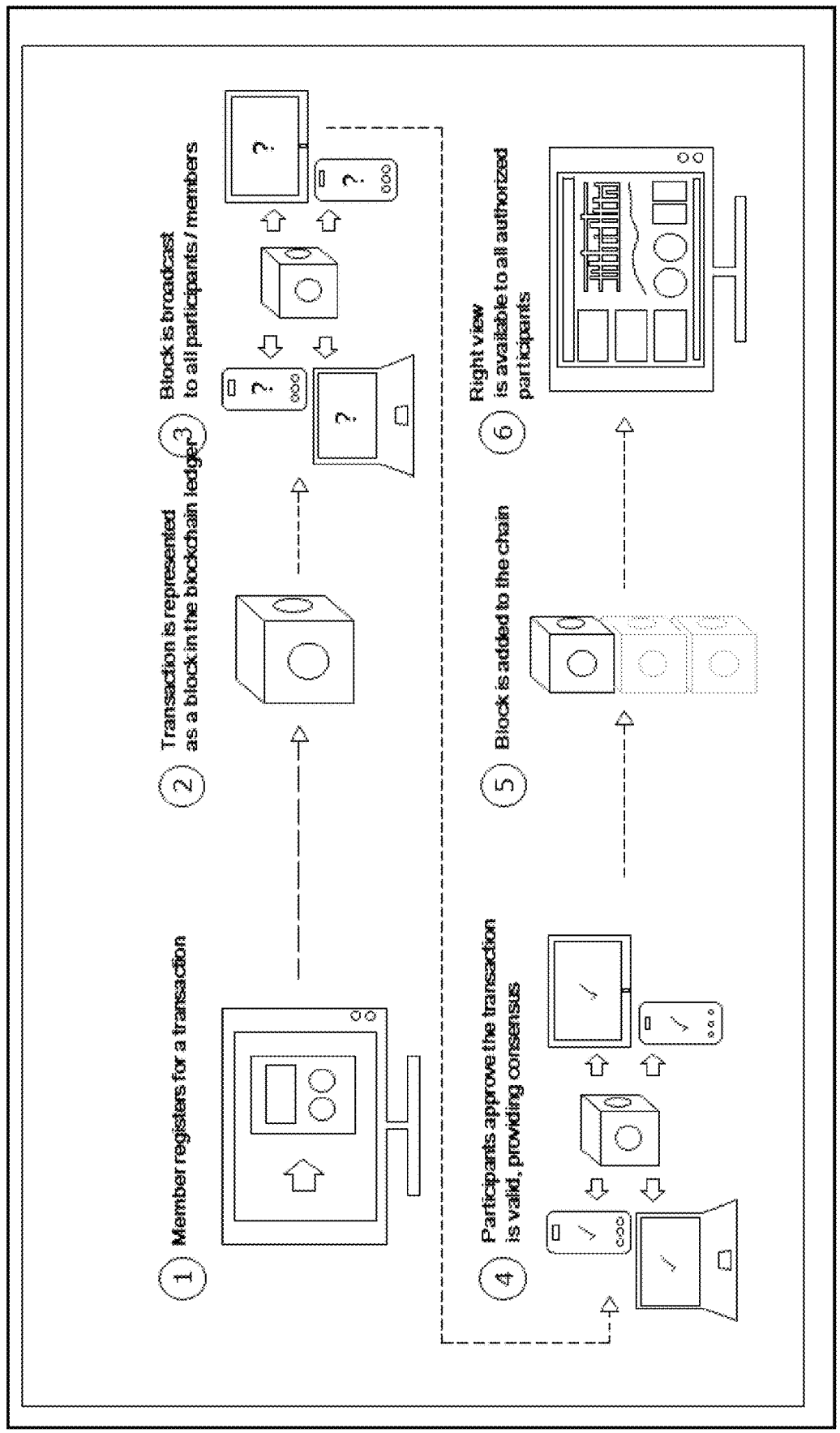
FIG. 9B illustrates a blockchain-enabled transaction process for storing and authorizing to view/access rights by members in an ecosystem in an embodiment.

FIG. 9B illustrates a blockchain-enabled transaction process for storing and authorizing to view/access the rights by the members 102 in the ecosystem 100, in accordance with an embodiment of the present invention. The blockchain 406 may accumulate the rights in the form of distributed electronic ledgers across a wide number of participants 102, to manage the transactions involving the rights using the right tokens 104. The ecosystem's distributed ledger approach may be applied more broadly, across various industries involving the transactions around the rights or digital assets.

The blockchain 406 may continuously grow the rights, stored as blocks, which may permanently be linked into a chain. Aftermarket blocks may contain data related to the rights such as: where they came from, who is the owner, who has acquired the rights in the past, reputation of the parties involve, scores, etc. The data related to the rights may be entered manually by authorized staff or automatically by enterprise resource planning (ERP) or maintenance management systems. Once entered according to the rules, data may be distributed to all the participants 102 in the blockchain 406. It may not be changed without a consensus of all the participants 102.

Figure 10:
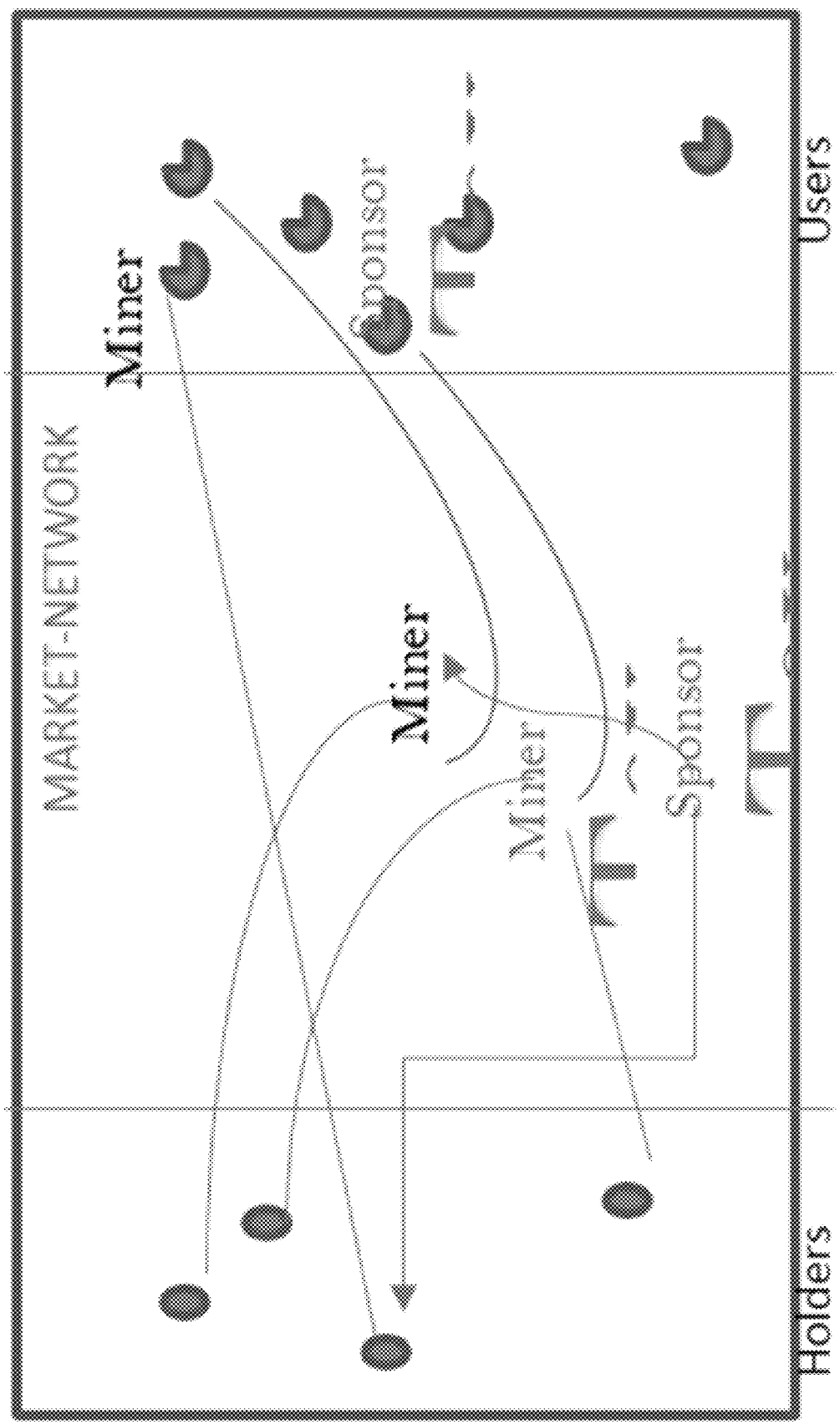
FIG. 10 provides an example of a market network enabled through an ecosystem in an embodiment.

FIG. 10 provides an example of a market network (also referred to as network) enabled through the ecosystem 100 in an embodiment with the various participants 102. The rights holders 106 (also referred to simply as holders) on the left interact with the Rights users 108 (also referred to as users simply) through the market network of the system 100. Some of the interactions may be facilitated by the miners 110 who bring together the digital transactions and knowledge exchanges. Certain rights users 108 may choose to reach out directly to the rights holders 106 for accessing their rights.

Referring back to FIGS. 1-8, in accordance with some embodiments of the present invention, there is provided an alternative dispute resolution (ADR) system 824 that me be included within or coupled communicatively to the computer-enabled networked ecosystem 100.

The ADR system 824 may be invoked through the smart contract 820 or the IP Wrapper 138 itself that may allow disputes around such as the rights (IPR) to be mediated through a qualified intermediary. The qualified intermediary may be an automated system or an organization such as WIPO (World Intellectual Property Organization).

For example, an innovator may register their design with the protocol enabled through the ecosystem 100 disclosed in the present disclosure. But, some other designer may believe that this was misappropriated from her work. She might initiate a dispute through the smart contract 820 (by signing on as a viewer and then invoking the ADR system 824 or mechanism) and asking for a qualified dispute resolution process to initiate fast-track proceedings to help resolve the dispute. Other examples may include such as for trade secrets. For example, an organization may use the protocol to compel their engineers to register their notebooks/ideas at a low cost. An organization may believe that another company has stolen their trade secret then they may initiate a dispute through the ADR system 824. There could be disputes around pricing or terms or other matters too that may be initiated through the ADR system 824.

The parties or systems involved in the disputes may belong to different jurisdictions and countries. The intermediary may also facilitate provisions for remedies. The remedies claimed in arbitration proceedings may include such as damages, infringement declarations and specific performance, such as a declaration of non-performance of contractual obligations, or of infringement of the rights, further safeguards for the preservation of confidentiality of evidence, the provision of a security, the production of data, the delivery of goods and the conclusion of new contracts. Each of these items may be defined in the form of a criterion to govern the disputes resolutions through the ADR system 824, wherein each such criterion may be defined as a parameter for use in calculating equivalent value for the remedies through an engine that may be contained within the ADR system 824 of the system 100 of the present invention. In such a scenario, the intermediary organization may use the calculations generated by the ADR system 824 to determine the remedies in view of the various criteria and parameters.

In various examples, the ADR system 824 may facilitate mediation relating to disputes for patents, infringements, copyrights, and the like without limitations. For example, the ADR system 824 may help settle a copyright license with a company regarding the publication of a technical publication.

In various embodiments of the present invention, the ADR system 824 may facilitate an online dispute resolution mechanism via a central web component such as a central web site 826 without limitations that may host the ecosystem 100. The ADR system 824 provides an integrated negotiation, mediation and arbitration dispute resolution solution to customers and merchants for digital transactions conducted online within the blockchain-enabled framework of the present invention.

The central web component 826 may provide an online framework for the parties to exchange information and propose solutions for resolving their disputes through the ADR system 824 digitally, in an embodiment. Qualified mediators/arbitrators may be appointed to resolve the disputes online which the parties may be unable to settle by themselves. In an embodiment, a contract clause may be provided for such an agreement and may be made available on the central web component 826 for the parties to insert in their contracts. The parties may agree to use one or more intermediaries, such as for negotiation, mediation or arbitration. The services may be performed online by qualified mediators and arbitrators, in an embodiment.

In an embodiment, the ADR system 824 may be implemented with the use of a computer system 828. Such a computer-implemented online dispute resolution method and system for application over a computer network 830 may be contained within and enabled by the blockchain framework of the present invention. In some embodiments, however, the ADR system 824 may be separately communicatively coupled to the blockchain-enabled system and may be managed separately through an external service provider such as an intermediary or a reputed and qualified organization.

In an example, there may be defined preferred timelines for the disputes resolution. The timelines may be varied in alternate embodiments.

In accordance with an embodiment, the computer-enabled networked ecosystem 100 may enable blockchain configured identifiers used for the blockchain transactions that may be created through cryptography such as, for example, public key cryptography. For example, a member of the network may create a destination identifier 832 based on the private key 806. The relationship between the private key 806 and the destination identifier 832 can later be used to provide "proof" that the user is associated with an output from that created transaction. The member can create another transaction to perform any other transaction in relation to the private key 806.

As the relationship between the destination identifier 832 and the corresponding private key 806 is only known by the particular member, the member has some amount of anonymity as they can create many different destination identifiers (which are only linked through the private key 806). A member's total association with multiple transactions included in the blockchain may thus be hidden from other members. While the details of a transaction may be publicly available on a distributed ledger 834, the underlying participants or members 102 to those transactions may be hidden because the identifiers are linked to private keys known only to the corresponding participants.

The computer-enabled networked ecosystem 100 may communicate with a blockchain computer system 836 (e.g., one or more nodes or blocks that store the distributed ledger 834). The computer system 828 may include a data storage (e.g., a memory circuit) 838, a transceiver 840 that communicates with remote computing devices, and a processing system 842 that includes a hardware processor 844. The data storage or memory circuit 838 stores one or more (usually two) ordered lists of data transaction requests per type identifier. The data transaction requests are received (via the transceiver) from the remote computing devices. The data storage 838 may also store digital money information that is information related to the right token 104 that are each associated with a different member account. Each such digital wallet includes or is linked to a corresponding private key and an identifier that has been generated using the private key 806. These identifiers may be used as blockchain addresses for sending and/or receiving transactions within the online marketplace component 128 of the computer-enabled networked ecosystem 100 of the present invention.

When a new transaction request is received at the computer system 828 from a remote computing device associated with a member of the network, the request is added to an ordered list that corresponds to the request's type identifier. The processing system 842 of the blockchain computer system 836 of the computer-enabled networked ecosystem 100 is configured to execute a matching engine to identify matches between various data transaction requests. For example, the processing system 842 identifies a match between a data transaction request stored in one of the ordered lists with another data transaction request (e.g., a newly received data transaction request). When a match is identified, new identifiers are generated that are based on the data (e.g., the private key 806) of the digital wallets 804 or right token accounts associated with the matched data transaction requests. The new identifiers are sent to the respective members 102 that then generate blockchain transactions using those identifiers. The computer system 828 then locates the match and monitors the blockchain 406 to determine when both blockchain transactions have been incorporated/included into the blockchain 406 to ensure proof and time stamping associated with the transactions such as for innovation enlisting or innovation exchange within the network of the members 102 of the computer-enabled networked ecosystem 100.

The computer-enabled networked ecosystem 100 may include components for managing intellectual property. The computer-enabled networked ecosystem 100 may include the computer system 828 comprising one or more physical processors such as 842 programmed by computer program instructions that, when executed, cause the computer system 828 to act. The instructions may cause the computer system 828 to receive intellectual property information from a first member, analyze the intellectual property information and store the analysis in an intellectual property database 846 of the blockchain 406, receive intellectual property criteria from a second member, determine a match between the first member and the second member based on a match between the stored analysis and the intellectual property criteria, and record a transaction between the first member and the second member over the blockchain 406. The transaction may include at least one contract term, in a data block of an intellectual property database 846. The transaction may involve receipt, from the first member and the second member, an approval of the contract term, perform a secure hashing operation on the data block containing the contract term to create a hashed block, and publish the hashed block to a private ledger 848 of the blockchain 406 implemented computer-enabled networked ecosystem 100.

In some implementations of the present disclosure, the computer-enabled networked ecosystem 100 may provide systems and processes for matching two or more intellectual property members that possess digitally maintained innovation in the form of computer executable files. For example, inventors seeking investors for a partnership, R&D teams seeking other teams for collaborative purposes, and investors seeking opportunities to invest their funds may each use the computer-enabled networked ecosystem 100 to find a prospective intellectual property partner. In some implementations, the members 102 may seek more than one match in the hopes of facilitating a multilateral deal. Systems consistent with the present disclosure may receive information from participating parties and analyze that information to facilitate the matching aspects of the system. Analyzed information may be sorted and codified to develop a computer executable intellectual property profile of the participating members 102 of the computer-enabled networked ecosystem 100.

The computer-enabled networked ecosystem 100 may include an intellectual property (IP) engine or simply engine 850 that may be programmed to receive intellectual property criteria from the system members 102. Intellectual property criteria may include characteristics that an intellectual property party is seeking in a potential transaction partner. For example, a technology start-up may be seeking a well-funded partner that is willing to take risks. Providers of capital may seek riskier investments, depending on their investment goals and the like. Intellectual property criteria may specify any of the aspects of intellectual property information as sought-after characteristics in an intellectual property partner.

The IP engine 850 may be programmed to receive intellectual property information and intellectual property criteria from the system members 102, i.e., intellectual property parties, as soon as they begin using the system. An intellectual property party may begin inputting intellectual property information, which may be used to build an intellectual property profile, prior to any matching with potential intellectual property partners. The gathered intellectual property information may serve to assist in matching with potential intellectual property partners.

In accordance with various embodiments as discussed above, automation of entire device integrity verification may be provided as part of the block chain transaction enabled through the disclosed system. In order to provide a validation of the device integrity, a device (or a user or a holder or a device associated with a user and/or a holder) that is performing a block chain instruction would perform an internal validation of the integrity of the execution environment from a root of trust in the device at the initialization of the block chain transaction. The device may, with or without human input create an instruction within the measured environment, in an embodiment. This instruction may then be sent to the block chain network for processing. The block chain network may require multiple signatures to accept the transaction. A first signature may be the created root instruction itself that may have the verification of the signature applied to the transaction. The network may then verify the integrity signature of the execution environment by comparing it with a previously recorded reference value. If the signature matches the reference value the transaction may be allowed to proceed. If the signature and the reference value do not match then the system may require a third out of band process to be completed that may verify that the transaction intended is allowed to proceed even if the execution environment is not in a known good condition. Because, block chain transactions do not have any verification or cyber security controls on an unknown device performing a transaction, embodiments of the present invention may allow a full validation of an unknown client device being in a known good condition according to a third party's statement that the device is configured correctly prior to the acceptance of a transaction. Some embodiments of the present invention, therefore, can address a broad range of cyber security controls that may be required as part of any block chain transaction processing system.

In an embodiment, server computers may be configured to provide a user device authentication system which may communicate with authenticators to confirm a requestor's identity prior to allowing the requestor to access resources protected by the authentication system. The server computers may not be separate server computers but part of a cloud network, in an embodiment.

While this invention has been particularly shown and described with references to example embodiments thereof, it will be understood by those skilled in the art that various changes in form and details may be made therein without departing from the scope of the invention encompassed by the disclosure.

In an embodiment, aspects of the present invention may provide systems and methods that allow for a generic and specialized, decentralized systems that are independent of a centralized resource and allows for the reporting and protecting of all types of smart devices including smart phones, laptop, tablets, or smart packages, and the like. In some embodiments, the device may comprise a security module or modules that interface with a decentralized network that maintains a secure distributed transactional ledger, or block chain, in order to send and/or receive data via the block chain. In some embodiments, the device may not operate when its ability to access a communication channel provided via secure distributed transactional ledger has been impeded or otherwise hindered.

In an embodiment, the right token may provide an industry leading protocol for creating a circle of trust for how the rights are created and shared in its marketplace enabling commercialization and monetization of the assets. As applied to digital files created for 3D printing, the Protocol may allow to create a possibility of protecting and commercializing the rights seamlessly, from a first instant of sharing a digital file to a final product delivered to a customer's hands. The token may serve as a borderless trusted digital marketplace that is open to all the participants, where people are matched because their registered interests have been mapped and cross-pollinated by autonomous bots. A paradise for creative spirits whose additive manufacturing designs for example may be autonomously alerted to potential collaborators, with licensing agreements being managed by the smart contracts, supplier performance being managed by reputation scores with royalty payments activated by the smart contracts ensuring that original designers receive royalties for every adapted additive manufacturing design variation because licensed usage is tracked with the consumption of every variant.

The protocol may allow to bring designers together to work for an automotive manufacturer for example. The designers may join the ecosystem 100 as member participants and register design rights and award a license to an outsourced participant using a smart contract for a part such as an out-of-production water adapter for example. An embedded QR code or serial number for on chain or digital transaction may facilitate an authorized workshop to produce the part and activates royalties for it, including from its original design holder. Small batch production of a little used or even obsolete part may then become economically feasible. The process for the commercialization of an otherwise underutilized design asset is thereby simplified, and is limitlessly repeatable with endless innovation possibilities. In an example, the members 102 may bid for use of the design and once a contract is awarded via a Smart Contract process, the successful bidder may receive a license to view or to print. A co-creation or innovation partnership may also be possible as an option where the design may be further developed or customized according to the participants needs. In such a use case scenario for example, the printed products may have a unique embedded QR code or a serial no. printed on the physical product that may include information about the material used, the designer, printing company and retailer. Upon execution of a print or a view, a royalty payment may be activated digitally and the transaction may be captured on the blockchain 406.

A reputation score may be captured on the blockchain 406 for future dealings with the participants or members 102 involved. Being a borderless distributed application of the ecosystem 100, the final product may be printed thousands of miles away without any compromise to the rights of the designer and the quality of the product without risks of data corruption in transit. Of course, the process may also reduce import taxes.

The protocol may facilitate tokenization of the assets through efficient transfers between creators, termed the Rights Holders 106 and commercialization-oriented agents—such as the Scouts or miners 110 and who are continuously assessing commercial fits for consumer, scientific or industrial applications of particular rights. It may allow enhancement of the rights, assignment or payment of royalties, and the creation of reputations associated with the know-how or the rights. The Rights Holders 106 may be able to share and transfer the rights, by way of licensing, to Users 108 and the Scouts 110 in exchange for the right tokens.

In an example, when a license is assigned to a successful bidder, licensing software may be downloadable by a licensee for installation that may assign a unique code/license for the authorization to view or print. The licensing software may give print instructions to a printer and cease to release print instructions according to a time or volume limit that may be agreed. The smart contract may also be activated once the Rights holder 106 assigns the license and it may track the terms of use for the period agreed or the volume of licenses paid for. For each part printed it may also be possible to embed a QR code or a holographic image. This proof of original manufacturer's code can be coded into the Blockchain 406 so that this original part may be authenticated by any customers or workshops that may need to deal with them. This may ensure provenance of goods in an event there are as well counterfeits that of the originals that have become available through reverse engineering or some other forms of unscrupulous behavior.

Exemplary embodiments of the present invention are further discussed herein:

In an example, the ecosystem may facilitate digital exchange of a digital asset stored as a computer executable file, wherein the ecosystem may include a plurality of participant systems, wherein the plurality of participant systems may include at least one of an asset user system, an asset holder system, and an asset mining system, wherein each of the asset user system, the asset holder system, and the asset mining system may be associated with respective participant entities registered with the ecosystem through respective digital and uniquely identifiable profiles. The ecosystem may include an asset wrapper associated with the digital asset and configured in the form of a multi-layered structure and computer-executable document, wherein the multi-layered structure includes a first layer to store source information digitally owned by a first participant, a second layer to store updates on the source information digitally owned by a second participant, and a third layer to store referencing of the updates between the first layer and the second layer. The ecosystem may include a codec configured as a computer executable file and associated with the asset wrapper, wherein the codec may be executed when an external request for the asset exchange is initiated. The ecosystem may include a codec authorizing cluster configured to initiate a handshake mechanism for performing a set of computer-controlled authorization tasks based on a private user key, wherein the authorization may determine whether the asset user system and its associated user entity may be allowed to access the digital asset digitally under existing access rights. The ecosystem may include a processing circuit configured to pull the asset associated with the asset wrapper if the codec authorization cluster authorizes the access. The ecosystem may include an encryption-decryption mechanism configured to decrypt the asset for presentation to the user. The ecosystem may include a blockchain device to execute a blockchain smart contract for the asset exchange, wherein the smart contract is executed against a pre-defined number of right tokens characterizing a specific cryptocurrency-value.

The asset wrapper may be configured with a specialized data structure containing a plurality of data fields, wherein the plurality of data fields comprising one or more of a general description field storing digital information associated with the digital asset, a contractual field storing digital information containing licensing and contractual terms for retaining the digital asset, a report infringement field digitally storing information related to procedures for reporting infringements on the associated digital asset, an additional links field for digitally storing details about the asset holder system and its respective participant entity, and a transaction history field for digitally storing information related to contact details of the asset holder system and the respective participant entity.

The ecosystem further includes a blockchain-based identity verification system, a private key wallet, and an associated private key, wherein the identity verification system includes a biometric recognition device and is configured to authorize verifiable digital identity profile attached to a blockchain private key and the private key wallet of the user participant based on biometric information associated with a user participant of the asset user system.

The embodiments herein may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The technique's provided by the embodiments herein may be implemented on an integrated circuit chip (not shown).

The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
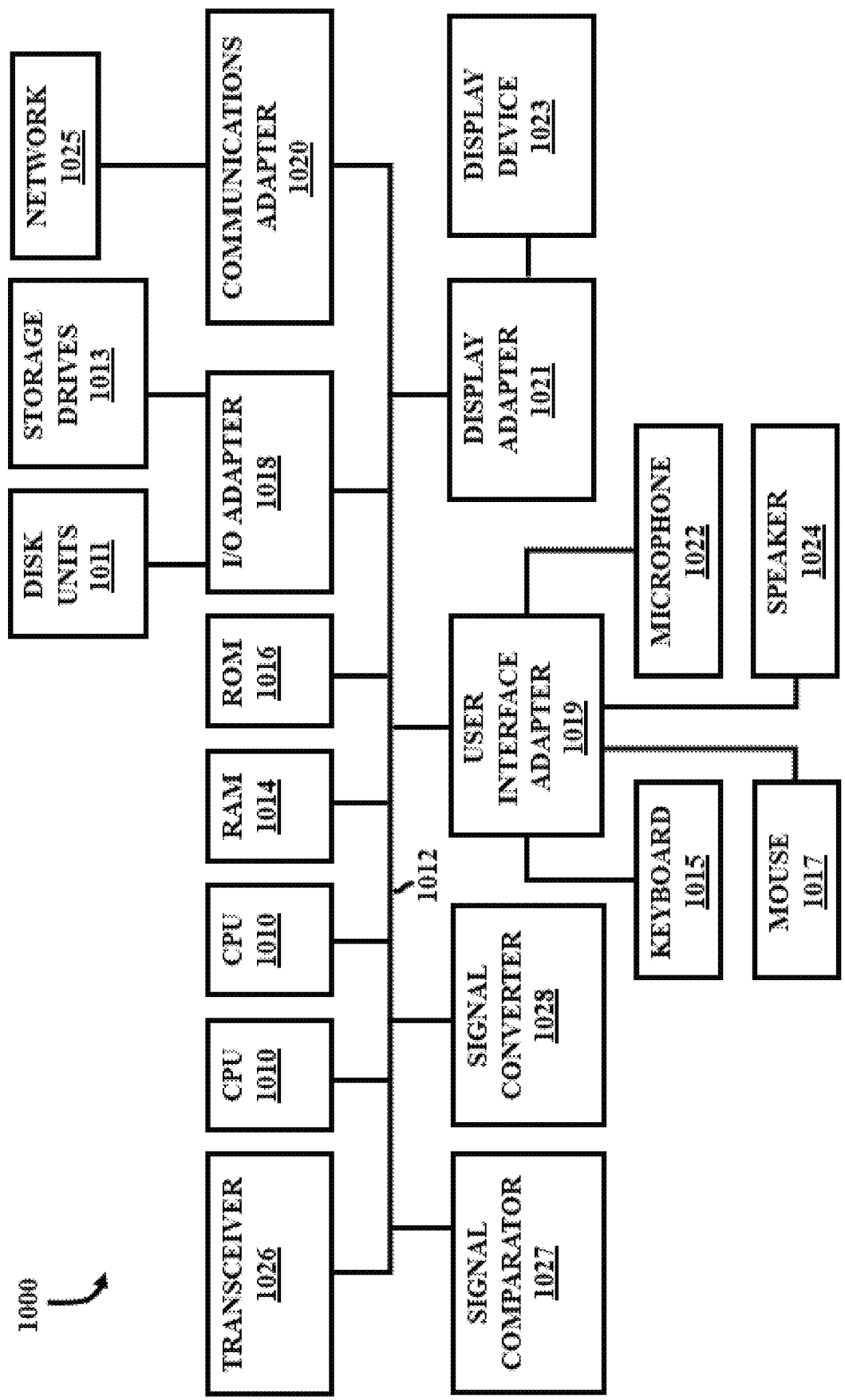
FIG. 11 is a schematic diagram illustrating a computer system according to an embodiment herein.

A representative hardware environment for practicing the embodiments herein is depicted in FIG. 11, with reference to FIGS. 1 through 10. This schematic drawing illustrates a hardware configuration of an information handling/computer system 1000 in accordance with an exemplary embodiment herein. The system 1000 comprises at least one processor or central processing unit (CPU) 1010. The CPUs 1010 are interconnected via system bus 1012 to various devices such as a random access memory (RAM) 1014, read-only memory (ROM) 1016, and an input/output (I/O) adapter 1018. The I/O adapter 1018 can connect to peripheral devices, such as disk units 1011 and storage drives 1013, or other program storage devices that are readable by the system. The system 1000 can read the inventive instructions on the program storage devices and follow these instructions to execute the methodology of the embodiments herein. The system 1000 further includes a user interface adapter 1019 that connects a keyboard 1015, mouse 1017, speaker 1024, microphone 1022, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1023, which provides a GUI (e.g., a gadget) in accordance with the embodiments herein, or which may be embodied as an output device such as a monitor, printer, or transmitter, for example. Further, a transceiver 1026, a signal comparator 1027, and a signal converter 1028 may be connected with the bus 1012 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An ecosystem for facilitating digital exchange of a digital asset stored as a computer executable file, wherein the ecosystem comprising:
    a plurality of participant systems, wherein the plurality of participant systems comprising at least one of an asset user system, an asset holder system, and an asset mining system, wherein each of the asset user system, the asset holder system, and the asset mining system are associated with respective participant entities registered with the ecosystem through respective digital and uniquely identifiable profiles;
    a blockchain device to execute a blockchain smart contract for the asset exchange, wherein the smart contract is executed against a pre-defined number of right tokens characterizing a specific cryptocurrency-value;
    a processing circuit that:
        receives an external request for exchange of the digital asset stored as the computer executable file from a participant system from the plurality of participant systems;
        creates an asset wrapper corresponding to the digital asset, wherein the asset wrapper comprises a multi-layered structure and a plurality of data fields;
        stores source information digitally owned by a first participant in a first layer of the multi-layered structure of the asset wrapper;
        stores updates on the source information digitally owned by a second participant in a second layer of the multi-layered structure of the asset wrapper;
        stores referencing of the updates between the first layer and the second layer in a third layer of the multi-layered structure of the asset wrapper;

stores at least one of digital information associated with the digital asset in a general description field of the plurality of data fields, digital information containing licensing and contractual terms for retaining the digital asset in a contractual field of the plurality of data fields, information related to procedures for reporting infringements on the associated digital asset in a report infringement field of the plurality of data fields, details about the asset holder system and its respective participants entity in an additional links field of the plurality of data fields, and information related to contact details of the asset holder system and the respective participant entity in a transaction history field of the plurality of data fields;

executes a codec stored as a computer executable file and associated with the asset wrapper;

determines whether the participant system requesting the digital asset has access rights to the first layer, the second layer and the third layer of the multi-layered structure and the plurality of data fields of the multi-layered structure of the asset wrapper associated with the digital asset, wherein determine whether the participant system requesting the digital asset has the access rights comprises:

request the access rights for the first layer, the second layer and the third layer of the multi-layered structure and the plurality of data fields of the asset wrapper from a codec authorizing cluster, and authorizes the participant system requesting the digital asset has the access rights for the first layer, the second layer and the third layer of the multi-layered structure and the plurality of data fields of the asset wrapper by initiating a handshake mechanism, for performing a set of computer-controlled authorization tasks, based on a private user key and the blockchain smart contract executed against the pre-defined number of right tokens;

pulls an encrypted digital asset associated with the first layer, the second layer and the third layer of the multi-layered structure and the plurality of data fields of the asset wrapper from a database in response to determining that the participant system requesting the digital asset has the access rights to the first layer, the second layer and the third layer of the multi-layered structure and the plurality of data fields of the asset wrapper associated with the digital asset;

decrypts the encrypted digital asset using the codec comprising a decryption key; and display or message the digital asset to the participant system requesting the digital asset.

2. The ecosystem of claim 1, wherein the transaction history field further stores payee details for the asset holder system and the respective participant entity for transacting the digital asset in the right tokens.

3. The ecosystem of claim 1, wherein the codec includes a plurality of layers such that number of the layers in the codec corresponds to number of the fields in the asset wrapper.

4. The ecosystem of claim 1, wherein the asset wrapper is encapsulated by using a data structure defined by binary trees and linked lists.

5. The ecosystem of claim 1, wherein the blockchain device and the codec authorization cluster are connected to a blockchain network.

6. The ecosystem of claim 5, wherein the blockchain network facilitates a first blockchain instance comprising a first asset wrapper instance of the asset wrapper and, wherein the blockchain network facilitates a second blockchain instance comprising a second asset wrapper instance of the asset wrapper.

7. The ecosystem of claim 6, wherein the first asset wrapper instance comprises a first metadata layer to store metadata and keywords relating to information contained within the asset wrapper.

8. The ecosystem of claim 6, wherein the first asset wrapper instance further comprises a sub-layer that store blockchain hashes associated with the asset wrapper.

9. The ecosystem of claim 6, wherein the first wrapper instance may further include an extendible layer template (a sub-layer layout) that create additional layers to contain additional digital data types related to the asset.

10. The ecosystem of claim 6, wherein the second asset wrapper instance comprises a second metadata layer that store metadata and keywords relating to information contained within the asset wrapper.

11. The ecosystem of claim 6, wherein the second asset wrapper instance further comprises a sub-layer that store blockchain hashes associated with the asset wrapper.

12. The ecosystem of claim 6, wherein the second wrapper instance further include an extendible layer template (a sub-layer layout) that create additional layers to contain additional digital data types related to the asset.

13. The ecosystem of claim 6, wherein the second wrapper instance may further include the codec associated with the digital asset.

14. The ecosystem of claim 1, further comprising a blockchain-based identity verification system, a private key wallet, and an associated private key, wherein the identity verification system is authorizes verifiable digital identity profile attached to a blockchain private key and the private key wallet of the user participant.

15. The ecosystem of claim 14, wherein the blockchain-based identity verification device comprises a biometric recognition device that read biometric information associated with the user participant.

16. A non-transitory computer-readable storage device that stores executable instructions that, in response to execution, cause a blockchain device comprising a processor to perform operations, comprising:

receiving an external request for exchange of a digital asset stored as the computer executable file from a participant system from a plurality of participant systems, wherein the plurality of participant systems comprising at least one of an asset user system, an asset holder system, and an asset mining system, wherein each of the asset user system, the asset holder system, and the asset mining system are associated with respective participant entities registered with the ecosystem through respective digital and uniquely identifiable profiles;

creating an asset wrapper corresponding to the digital asset, wherein the asset wrapper comprises a multi-layered structure and a plurality of data fields;

storing source information digitally owned by a first participant in a first layer of the multi-layered structure of the assets asset wrapper;

storing updates on the source information digitally owned by a second participant in a second layer of the multi-layered structure of the assets asset wrapper;

storing referencing of the updates between the first layer and the second layer in a third layer of the multi-layered structure of the assets asset wrapper;

storing at least one of digital information associated with the digital asset in a general description field of the plurality of data fields, digital information containing licensing and contractual terms for retaining the digital asset in a contractual field of the plurality of data fields, information related to procedures for reporting infringements on the associated digital asset a report infringement field of the plurality of data fields, details about the asset holder system and its respective participants entity an additional links field of the plurality of data fields, and information related to contact details of the asset holder system and the respective participant entity in a transaction history field of the plurality of data fields;

executing a codec stored as a computer executable file and associated with an asset wrapper;

determining whether the participant system requesting the digital asset has access rights to the first layer, the second layer and the third layer of the multi-layered structure and the plurality of data fields of the multi-layered structure of the asset wrapper associated with the digital asset, wherein determine whether the participant system requesting the digital asset has the access rights comprises:
  requesting the access rights for the first layer, the second layer and the third layer of the multi-layered structure and the plurality of data fields of the asset wrapper from a codec authorizing cluster, and
  authorizing the participant system requesting the digital asset has the access rights for the first layer, the second layer and the third layer of the multi-layered structure and the plurality of data fields of the asset wrapper by initiating a handshake mechanism, for performing a set of computer-controlled authorization tasks, based on a private user key and a blockchain smart contract executed against the pre-defined number of right tokens;

pulling an encrypted digital asset associated with the first layer, the second layer and the third layer of the multi-layered structure and the plurality of data fields of the asset wrapper from a database in response to determining that the participant system requesting the digital asset has the access rights to the first layer, the second layer and the third layer of the multi-layered structure and the plurality of data fields of the asset wrapper associated with the digital asset;

decrypting the encrypted digital asset using the codec comprising a decryption key; and displaying or message the digital asset to the participant system requesting the digital asset.

17. A blockchain computer system comprising a plurality of asset user systems, a plurality of asset holder systems, a plurality of asset mining systems, and a plurality of blockchain devices, wherein each asset user system, each asset holder system, and each asset mining system are associated with respective participant entities registered with the computer system through respective digital and uniquely identifiable profiles, and wherein each blockchain device comprises a processor and a non-transitory computer-readable storage device that stores executable instructions that, when executed by the processor, causes the processor to perform operations, comprising:
  receiving an external request for exchange of a digital asset stored as the computer executable file from a participant system from a plurality of participant systems, wherein the plurality of participant systems comprising at least one of an asset user system, an asset holder system, and an asset mining system, wherein each of the asset user system, the asset holder system, and the asset mining system are associated with respective participant entities registered with the computer system through respective digital and uniquely identifiable profiles;

creating an asset wrapper corresponding to the digital asset, wherein the asset wrapper comprises a multi-layered structure and a plurality of data fields;

storing source information digitally owned by a first participant in a first layer of the multi-layered structure of the assets asset wrapper;

storing updates on the source information digitally owned by a second participant in a second layer of the multi-layered structure of the assets asset wrapper;

storing referencing of the updates between the first layer and the second layer in a third layer of the multi-layered structure of the assets asset wrapper;

storing at least one of digital information associated with the digital asset in a general description field of the plurality of data fields, digital information containing licensing and contractual terms for retaining the digital asset in a contractual field of the plurality of data fields, information related to procedures for reporting infringements on the associated digital asset a report infringement field of the plurality of data fields, details about the asset holder system and its respective participants entity an additional links field of the plurality of data fields, and information related to contact details of the asset holder system and the respective participant entity in a transaction history field of the plurality of data fields;

executing a codec stored as a computer executable file and associated with an asset wrapper;

determining whether the participant system requesting the digital asset has access rights to the first layer, the second layer and the third layer of the multi-layered structure and the plurality of data fields of the multi-layered structure of the asset wrapper associated with the digital asset, wherein determine whether the participant system requesting the digital asset has the access rights comprises:
  requesting the access rights for the first layer, the second layer and the third layer of the multi-layered structure and the plurality of data fields of the asset wrapper from a codec authorizing cluster, and
  authorizing the participant system requesting the digital asset has the access rights for the first layer, the second layer and the third layer of the multi-layered structure and the plurality of data fields of the asset wrapper by initiating a handshake mechanism, for performing a set of computer-controlled authorization tasks, based on a private user key and a blockchain smart contract executed against the pre-defined number of right tokens;

pulling an encrypted digital asset associated with the first layer, the second layer and the third layer of the multi-layered structure and the plurality of data fields of the asset wrapper from a database in response to determining that the participant system requesting the digital asset has the access rights to the first layer, the second layer and the third layer of the multi-layered structure and the plurality of data fields of the asset wrapper associated with the digital asset;

decrypting the encrypted digital asset using the codec comprising a decryption key; and displaying or message the digital asset to the participant system requesting the digital asset.

* * * * *